US010681564B2

United States Patent
Tang et al.

(10) Patent No.: US 10,681,564 B2
(45) Date of Patent: Jun. 9, 2020

(54) METHOD AND NODES FOR DATA TRANSMISSION OVER A LINE OF SIGHT CHANNEL

(71) Applicants: Taiwen Tang, Nepean (CA); Ahikam Aharony, Kanata (CA); Ming Jian, Kanata (CA)

(72) Inventors: Taiwen Tang, Nepean (CA); Ahikam Aharony, Kanata (CA); Ming Jian, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/789,450

(22) Filed: Oct. 20, 2017

(65) Prior Publication Data
US 2019/0124520 A1 Apr. 25, 2019

(51) Int. Cl.
*H04W 16/28* (2009.01)
*H04L 5/00* (2006.01)
(Continued)

(52) U.S. Cl.
CPC .......... *H04W 16/28* (2013.01); *H04B 7/0456* (2013.01); *H04L 5/005* (2013.01);
(Continued)

(58) Field of Classification Search
CPC .. H04B 7/0024; H04B 7/0413; H04B 7/0456; H04B 7/2606; H04W 16/26; H04W 16/28; H04W 28/18; H04W 28/24
See application file for complete search history.

(56) References Cited

U.S. PATENT DOCUMENTS

| 9,209,871 B2* | 12/2015 | Agee | H04B 7/0413 |
| 2008/0076433 A1* | 3/2008 | Cheng | H04B 7/2606 455/442 |

(Continued)

FOREIGN PATENT DOCUMENTS

| CN | 103634022 A | 3/2014 |
| CN | 104980380 A | 10/2015 |
| CN | 105049100 A | 11/2015 |

OTHER PUBLICATIONS

Lee et al., Distributed Real-Time Implementation of Interference Alignment with Analog Feedback, IEEE Transactions on Vehicular Technology, Aug. 2015, pp. 3513-3525, vol. 64, No. 8, IEEE.

(Continued)

*Primary Examiner* — Jean A Gelin
(74) *Attorney, Agent, or Firm* — BCF LLP

(57) ABSTRACT

The present disclosure relates to data transmission between a node and peer nodes. Interference alignment techniques are used to mitigate interference between the nodes on a line of sight channel A data stream is exchanged in two transmissions between the node and a peer node. The two transmissions are formed according to an interference alignment precoding matrix. The node may include linearly aligned antennas. To mitigate further the interference between the node and the peer node, a pair of these antennas is selected for communication with the peer node as a function of a distance between the node and the peer node and as a function of a wavelength of the communication. Channel state information may be exchanged between the node and the peer node for precoding matrix selection and for antenna selection. The antennas used for communication between the nodes and the peer nodes may be beamforming antennas.

21 Claims, 12 Drawing Sheets

(51) Int. Cl.
*H04B 7/0456* (2017.01)
*H04B 7/06* (2006.01)

(52) U.S. Cl.
CPC .......... *H04L 5/0044* (2013.01); *H04L 5/0053* (2013.01); *H04L 5/0058* (2013.01); *H04B 7/061* (2013.01); *H04L 5/0057* (2013.01)

(56) References Cited

U.S. PATENT DOCUMENTS

| | | | |
|---|---|---|---|
| 2010/0039228 A1* | 2/2010 | Sadr | G01S 5/12 340/10.1 |
| 2011/0002371 A1* | 1/2011 | Forenza | H04B 7/0417 375/227 |
| 2014/0009347 A1* | 1/2014 | Bertin | H01Q 1/2258 343/725 |
| 2014/0036815 A1* | 2/2014 | Lei | H04B 7/024 370/329 |
| 2015/0103753 A1 | 4/2015 | Maddah-Ali et al. | |
| 2015/0295671 A1 | 10/2015 | Na et al. | |

OTHER PUBLICATIONS

Peters et al., Interference Alignment via Alternating Minimization, IEEE International Conference on Acoustics, Speech and Signal Processing 2009, 2009, pp. 2445-2448, IEEE, Austin, USA.

\* cited by examiner

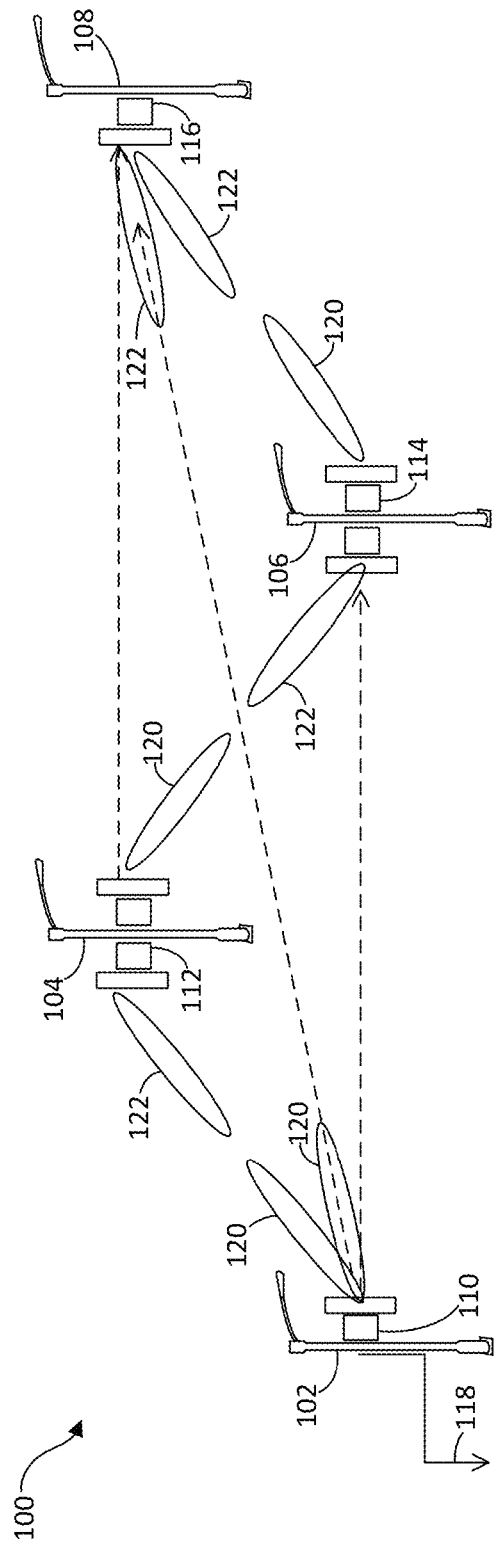
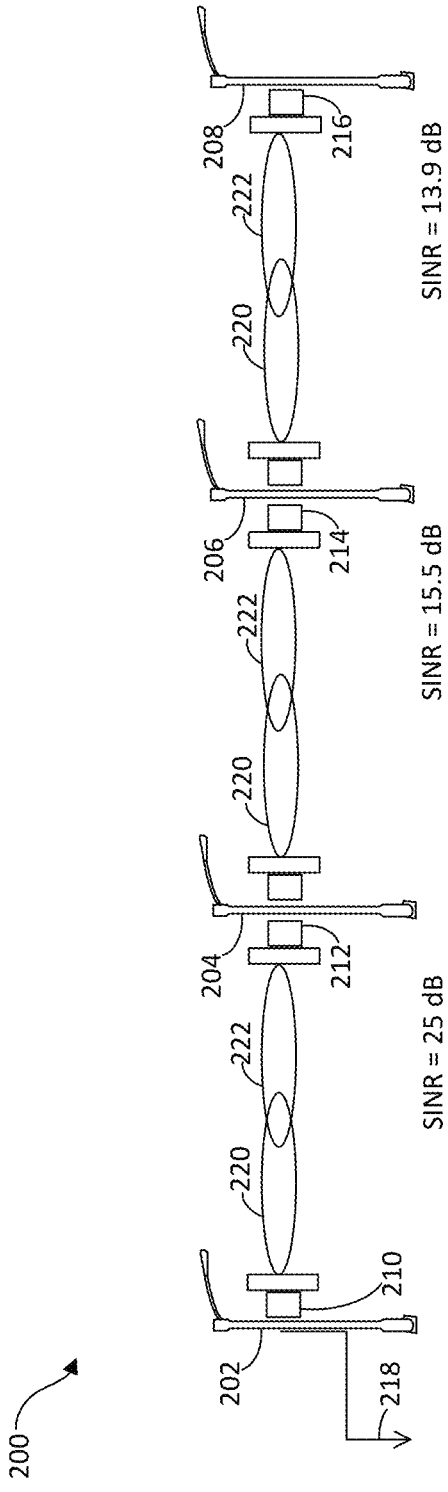
FIGURE 1
FIGURE 2

METHOD AND NODES FOR DATA TRANSMISSION OVER A LINE OF SIGHT CHANNEL

TECHNICAL FIELD

The present disclosure relates to the field of wireless communications and in particular to methods and to nodes adapted for data transmission between peer nodes.

BACKGROUND

Cost-effective dense deployment is an important enabler of long-term evolution (LTE) and fifth generation (5G) wireless networks. So-called small cells, access nodes (also referred to as access points or base stations) that each serves a number of proximally located user equipment (UE) terminals with a lower transmit power than conventional base stations, are effective in supporting ultra-dense broadband access. Each small cell is connected to core network via a backhaul connection.

One technique for deploying small cells comprises the placement of radio base stations, oftentimes called evolved node B (eNB) in LTE and next generation node B (gNB) 5G terminology, on lampposts distributed along a street. Electrical connections are already available at each lamppost to power lights, and can conveniently be used provide power to the eNBs. Providing wired backhaul access (e.g. using optical fiber) to a large number of lamppost-based base stations may be logistically difficult unless done during the construction of the street on which the nodes are deployed. A simpler solution is to provide backhaul connectivity to couple a first lamppost-based base station in a series to a core network. Each base station in the series can be wirelessly connected to adjacent base stations, creating a multihop connection to the first base station, which has the wired backhaul connection. In some embodiments, the wireless connection between base stations may use unlicensed wireless spectrum.

In such setups, it will be recognized that the lamppost mounted base stations are often in a straight line, resulting in interference between segments. Improvements are needed to mitigate interference over wireless spectrum used for daisy-chained base stations.

SUMMARY

It is an object of the present technology to ameliorate at least some of the inconveniences present in conventional techniques used to exchange backhaul information among serially connected radio base stations.

Generally stated, the present technology provides a method that facilitates multi-hop data transmission over a line of sight (LoS) channel and nodes configured for such multi-hop data transmission. A node receives a first data stream over two complementary transmissions that are both formed according to an interference alignment precoding matrix. The node transmits a distinct second data stream over two distinct complementary transmissions formed according to a distinct interference alignment precoding matrix. All transmissions are received and sent on the LoS channel. The distinct interference alignment precoding matrices mitigate interference between the first data stream received at the node and the second data stream transmitted by the node.

The present technology also provides a method using a plurality of selectable, linearly aligned antennas and to nodes having such antennas. In a node, a pair of antennas of the plurality of linearly aligned antennas is selected so that a spacing between the selected antennas is a function of a distance between the node and a peer node and of a wavelength of a communication exchanged between the node and the peer node. The selection of the pair of antennas according to their spacing ameliorates a signal to interference and noise ratio of the communication between the node and the peer node.

Either or both above methods may be implemented in a same node. Multi-hop communication between nodes that are aligned on the LoS channel is facilitated when using these methods, alone or in combination. Without limitation, the present technology is suitable for exchange of backhaul information among serially connected radio base stations.

According to a first aspect of the present technology, there is provided a data transmission method. The method comprises receiving, at a node from a first peer node, on a line of sight (LoS) channel, a first transmission carrying a first data stream and a second transmission carrying the first data stream. The first and second transmissions are formed according to a first interference alignment precoding matrix. A third transmission carrying a second data stream and a fourth transmission carrying the second data stream are transmitted, from the node to a second peer node, on the LoS channel. The third and fourth transmissions are formed according to a second interference alignment precoding matrix.

In some implementations of the present technology, the first interference alignment precoding matrix is defined based on a state of the LoS channel between the node and the first peer node, the second interference alignment precoding matrix being defined based on a state of the LoS channel between the first and third node.

In some implementations of the present technology, the method further comprises transmitting, from the node to the first peer node, on the LoS channel, a first channel state information (CSI) reference signal, receiving, at the node from the first peer node, on the LoS channel, a first CSI feedback signal, transmitting, from the node to the second peer node, on the LoS channel, a second CSI reference signal, and receiving, at the node from the second peer node, on the LoS channel, a second CSI feedback signal.

In some implementations of the present technology, the method further comprises decoding, at the node, the first data stream by application of a combining matrix to the first and second transmissions, the combining matrix corresponding to the first interference alignment precoding matrix.

In some implementations of the present technology, at least a portion of the first data stream comprises backhaul information, and at least a portion of the second data stream comprises backhaul information.

According to a second aspect of the present technology, there is provided a data transmission method. The method comprises communicating between a node and a peer node using a pair of antennas of the node. The antennas of the pair are selected among a plurality of linearly aligned antennas so that a spacing between the antennas of the pair is a function of a distance between the node and the peer node and of a wavelength of a communication exchanged between the node and the peer node.

In some implementations of the present technology, communicating between the node and the peer node comprises transmitting a signal from the node to the peer node at a first amplitude and a first phase using a first antenna of the pair and at a second amplitude and a second phase using a second antenna of the pair, the first amplitude being different from the second amplitude and the second phase being different from the second phase.

In some implementations of the present technology, the antennas of the plurality of linearly aligned antennas are beamforming antennas.

In some implementations of the present technology, the method further comprises, for each pair of antennas among the plurality of linearly aligned antennas, transmitting, from the node to the peer node, a channel state information (CSI) reference signal and receiving, at the node from the peer node, a CSI feedback signal, the method also comprising selecting the antennas of the pair according to a most favorable of the received CSI feedback signals.

In some implementations of the present technology, the plurality of linearly aligned antennas comprises at least four antennas, a spacing between any pair of antennas selected among four of the at least four antennas being different from a spacing between any other pair of antennas among the four of the at least four antennas.

According to a third aspect of the present technology, there is provided a node comprising a first receiver and a first transmitter. The first receiver is adapted to receive, from a first peer node, on a line of sight (LoS) channel, a first transmission carrying a first data stream and a second transmission carrying the first data stream, the first and second transmissions being formed according to a first interference alignment precoding matrix. The first transmitter is adapted to transmit, to a second peer node, on the LoS channel, a third transmission carrying a second data stream and a fourth transmission carrying the second data stream, the third and fourth transmissions being formed according to a second interference alignment precoding matrix.

In some implementations of the present technology, the node further comprises a second receiver adapted to receive, from the second peer node, on the LoS channel, a fifth transmission carrying a third data stream and a sixth transmission carrying the third data stream, the fifth and sixth transmissions being formed according to a third interference alignment precoding matrix and a second transmitter adapted to transmit, to the first peer node, on the LoS channel, a seventh transmission carrying a fourth data stream and an eighth transmission carrying the fourth data stream, the seventh and eighth transmissions being formed according to a fourth interference alignment precoding matrix.

In some implementations of the present technology, the node further comprises a first receive antenna operatively connected to the first receiver, a second receive antenna operatively connected to the second receiver, a first transmit antenna operatively connected to the first transmitter, and a second transmit antenna operatively connected to the second transmitter.

In some implementations of the present technology, the first and second receive antennas and the first and second transmit antennas are beamforming antenna.

In some implementations of the present technology, the node further comprises a processor operatively connected to the first and second transmitters and to the first and second receivers. The processor is adapted to cause the first transmitter to transmit, to the first peer node, on the LoS channel, a first channel state information (CSI) reference signal, and to acquire from the first receiver a first CSI feedback signal received from the first peer node on the LoS channel. The processor is further adapted to cause the second transmitter to transmit, to the second peer node, on the LoS channel, a second CSI reference signal, and to acquire from the second receiver a second CSI feedback signal received from the second peer node on the LoS channel.

In some implementations of the present technology, the processor is further adapted to define the first and fourth interference alignment precoding matrices based on a state of the LoS channel between the node and the first peer node, the state being determined based on the first CSI feedback signal. The processor is also adapted to define the second and third interference alignment precoding matrices based on the state of the LoS channel between the node and the second peer node, the state being determined based on the second CSI feedback signal.

In some implementations of the present technology, the node further comprises a radio base station adapted to receive a third data stream from a user terminal on a separate channel, the processor being further adapted to insert the first data stream as a first portion of the second data stream, and to insert the third data stream as a second portion of the second data stream.

In some implementations of the present technology, the node further comprises a radio base station adapted to transmit a third data stream a user terminal on a separate channel, the processor being further adapted to extract the third data stream from a first portion of the first data stream, and to insert a second portion of the first data stream as the second data stream.

In some implementations of the present technology, the node further comprises a radio base station adapted to communicate with a user terminal, wherein the first data stream comprises backhaul information for the radio base station, and wherein the second data stream comprises further backhaul information for the second peer node.

According to a fourth aspect of the present technology, there is provided a node comprising a radio interface unit, a plurality of linearly aligned antennas and a processor. The radio interface unit is adapted to communicate with a peer node. The antennas of the plurality of linearly aligned antennas are communicatively coupled to the radio interface unit. The processor is operatively connected to the radio interface unit and adapted to select a pair of antennas among the plurality of linearly aligned antennas for the radio interface unit to communicate with the peer node. The processor selects the pair of antennas so that a spacing between the antennas of the pair is a function of a distance between the node and the peer node and of a wavelength of a communication exchanged between the node and the peer node.

In some implementations of the present technology, the processor is further adapted to, for each pair of antennas among the plurality of linearly aligned antennas, cause the radio interface unit to transmit, to the peer node, a channel state information (CSI) reference signal, and acquire, from the radio interface unit, a CSI feedback signal received from the peer node. The processor selects the antennas of the pair according to a most favorable of the received CSI feedback signals.

In some implementations of the present technology, the node further comprises a fiber access point operatively connected to the processor and adapted for communicatively coupling the radio interface unit and a core network.

In some implementations of the present technology, an antenna spacing factor is defined as $s = 5 \cdot \sqrt{lamba}$, wherein s is the antenna spacing factor in meters and lambda is the wavelength in meters.

In some implementations of the present technology, the plurality of linearly aligned antennas comprises a first antenna, a second antenna positioned at a spacing s from the first antenna, a third antenna positioned at a spacing 2s from the second antenna and at a spacing 3s from the first antenna, and a fourth antenna positioned at a spacing 3.5s from the third antenna and at a spacing 6.5s from the first antenna.

In some implementations of the present technology, the plurality of linearly aligned antennas comprises a first antenna, a second antenna positioned at a spacing 2s from the first antenna, a third antenna positioned at a spacing s from the second antenna and at a spacing 3s from the first antenna, and a fourth antenna positioned at a spacing 3.5s from the third antenna and at a spacing 6.5s from the first antenna.

In some implementations of the present technology, the plurality of linearly aligned antennas comprises a first antenna, a second antenna positioned at a spacing 1.5s from the first antenna, a third antenna positioned at a spacing s from the second antenna and at a spacing 2.5s from the first antenna, and a fourth antenna positioned at a spacing 3.5s from the third antenna and at a spacing 6s from the first antenna.

In some implementations of the present technology, the radio interface comprises a transmitter, and the processor is further adapted to cause the transmitter to transmit a signal to the peer node at a first amplitude and a first phase using a first antenna of the pair and at a second amplitude and a second phase using a second antenna of the pair, the first amplitude being different from the second amplitude and the second phase being different from the second phase.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will be described by way of example only with reference to the accompanying drawings, in which:

FIG. 1 is a schematic representation of nodes mounted on a series of lampposts, showing backhauling signals exchanged between each node;

FIG. 2 is a schematic representation of nodes mounted on a series of lampposts, showing backhauling signals exchanged between each node, the lampposts being on a line of sight (LoS) channel;

Like numerals represent like features on the various drawings.

DETAILED DESCRIPTION

Figure 3:
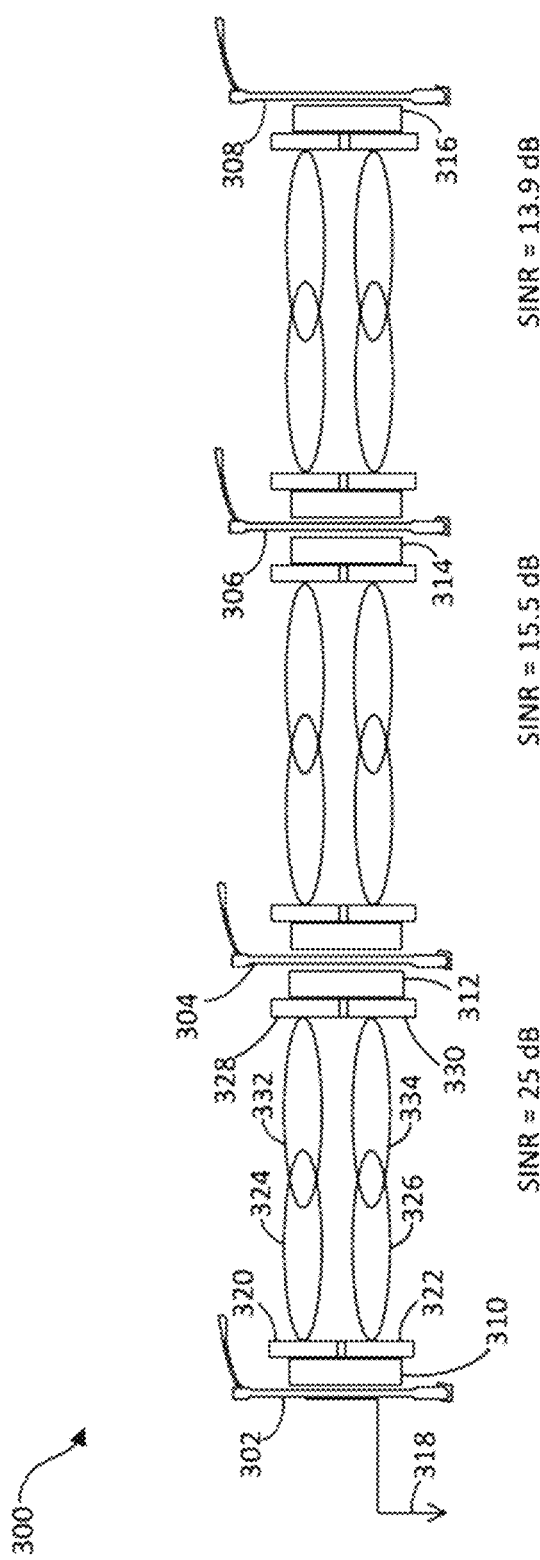
FIG. 3 is a schematic representation of nodes mounted on a series of lampposts as in FIG. 2, the nodes communicating using MIMO on a LoS channel.

Various aspects of the present disclosure generally address one or more of the problems related to daisy chaining of nodes such as base stations.

The present disclosure introduces techniques for the transmission of backhaul information between daisy-chained base stations. The base stations may, in a non-limitative example, be installed on a series of communicatively connected lampposts that are substantially linearly aligned along a street. Owing to their placement, the base stations are on a line of sight (LoS) channel covering the entire series of lampposts. This linear arrangement of the base stations could negatively impact the signal to interference and noise (SINR) ratio between on the LoS channel because a signal sent from a first base station to a second base station could project beyond the second base station and interfere with another signal sent from the second base station to a third base station.

In one aspect, interference alignment is used to mitigate this interference and thereby improve the SINR between the various base stations when they are on the LoS channel.

In another aspect, a point-to-point multiple-input-multiple-output (MIMO) technique is used to transmit distinct data streams between two (2) base stations. Each base station includes a plurality of linearly aligned antennas for communicating with a given peer base station. For transmitting to or receiving from the given peer base station, the base station selects a pair of antennas among the plurality of linearly aligned antennas so that a spacing between the antennas of the pair is tailored to a distance between the base station and the given peer base station and to a wavelength of the communication between the base station and the given peer base station.

In a further aspect, the interference alignment technique and the point-to-point MIMO technique are combined in a same implementation.

The present technology is presented in the particular context of daisy-chained radio base stations mounted on lampposts, data transmission between the base stations containing backhaul information exchanged between the base stations and a core network. However, the present technology is not limited to such application involving radio base stations. Some aspects of the present technology may be used between any peer nodes of any type while some other aspects of the present technology may be used in nodes of any type having at least two peer nodes on a LoS channel.

Referring now to the drawings, FIG. 1 is a schematic representation of nodes mounted on a series of lampposts, showing backhauling signals exchanged between each node. A network 100 including a series of lampposts 102, 104, 106 and 108 carrying base stations 110, 112, 114 and 116 communicate on a wireless channel, for example on unlicensed spectrum. The first lamppost 102 has a fiber point of access 118 for exchanging backhaul information between the first base station 110 and a core network (not shown). Backhaul information is further exchanged between the first base station 110 and the base stations 112, 114 and 116 over the wireless channel, using downlink directional antenna beams 120 and uplink directional antenna beams 122. The lampposts of the network 100 are not placed on a straight line. As a result, no two downlink directional antenna beams 120 intersect and there is no intersection between any of the uplink directional antenna beams 122. Because the antenna beams are directional, SINR is well controlled over the entire network 100.

The base stations 110, 112, 114 and 116 each include one or more transceiver, or alternatively one or more transmitter and one or more receiver connected to antennas for supporting communication, for example LTE or 5G communication with proximally located user equipment (UE) terminals (internal components of the base stations are not shown).

In a case where base stations are positioned on lampposts along a street, given typical distances between the lampposts and typical street widths, the widths being significantly less than the distances between the lampposts, the lampposts are substantially aligned on a same line of sight. Furthermore, on many roads, lampposts are positioned only on one side of the road (or in the middle of the road). As a result, the configuration of FIG. 1 is frequently unavailable.

FIG. 2 is a schematic representation of nodes mounted on a series of linearly arranged lampposts, showing backhauling signals exchanged between each node, the lampposts being on a line of sight (LoS) channel A network 200 including a series of lampposts 202, 204, 206 and 208 carrying base stations 210, 212, 214 and 216 communicate on a wireless channel, for example on unlicensed spectrum. The first lamppost 202 has a fiber point of access 218 for providing a backhaul connection between the first base station 210 and the core network. The wireless connections between the first base station 210 and the base stations 212, 214 and 216 are used to provide a backhaul connection to base stations 212, 214 and 216, using downlink directional antenna beams 220 and uplink directional antenna beams 222. The lampposts of the network 100 are placed on a straight line, which means that all downlink and unlink directional antenna beams are on a LoS channel. This arrangement is detrimental to the SINR over the network 200. For instance, a first downlink directional antenna beam 220 emitted from the first base station 210 toward at the second base station 212 further radiates beyond the second base station 212 toward the third base station 214. Each base station may attenuate (i.e. block) a received uplink or downlink antenna beam by, for example, about 10 dB; this attenuation does not however suffice to overcome the SINR degradation. In the example of FIG. 2, the SINR of the downlink signal received at the second base station 212 is of 25 dB, the SINR of the downlink signal received at the third base station 212 is reduced to 15.5 dB, and the SINR of the downlink signal received at the third base station 214 is severely reduced to 13.9 dB.

FIG. 3 is a schematic representation of nodes mounted on a series of lampposts as in FIG. 2, the nodes communicating using MIMO antennas on a LoS channel A network 300 including a series of lampposts 302, 304, 306 and 208 carrying base stations 310, 312, 314 and 316 differs from the network 200 of FIG. 2 in that the base stations 310, 312, 314 and 316 exchange backhaul information using MIMO antenna configurations. The first lamppost 302 has a fiber point of access 318 for exchanging backhaul information between the first base station 310 and the core network. To exchange further backhaul information between the first base station 310 and the base stations 312, 314 and 316 over the wireless channel, each base station splits the backhaul information in two distinct data streams. For instance, the first base station 310 splits downlink backhaul information to be sent toward the second base station 312 in two streams. The two distinct streams are emitted by MIMO antennas 320, 322 of the base station 310, forming two distinct downlink directional beams 324, 326. The two distinct downlink directional beams 324, 326 are received at MIMO antennas 328, 330 of the second base station 312. In the opposite direction, the second base station 312 splits uplink backhaul information to be sent toward the first base station 310 in two distinct streams. The two distinct streams are emitted by the MIMO antennas 328, 330 of the base station 310, forming two distinct uplink directional beams 332, 334. The two distinct uplink directional beams 332, 334 are received at the MIMO antennas 320, 322 of first base station 310. Similar arrangements are used to exchange further backhaul information between the base stations 312, 314 and 316.

Unfortunately, use of MIMO technology to exchange backhaul information between base stations located on the LoS channel does not ameliorate the SINR of the signals received at each base station.

Figure 4:
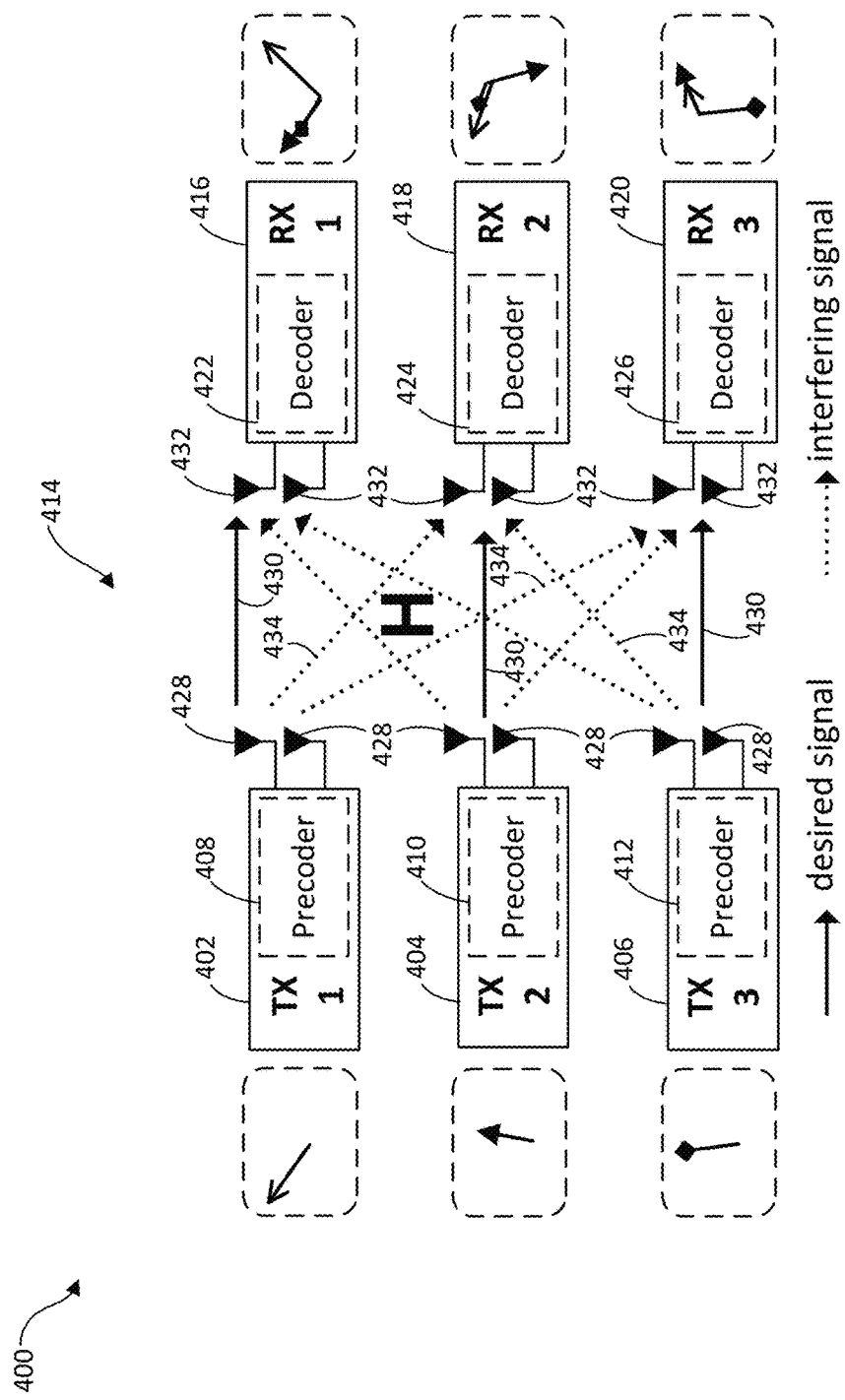
FIG. 4 is a block diagram illustrating interference alignment for communication between two nodes.

FIG. 4 is a block diagram illustrating interference alignment for communication between two nodes. A network 400 comprises three (3) transmitters 402, 404 and 406 that, in turn, include precoders 408, 410 and 412. Each of the three transmitters 402, 404 and 406 respectively communicate over a channel 414 with each of the three (3) receivers 416, 418 and 420 that, in turn, include decoders 422, 424 and 426. Each transmitter 402, 404 and 406 has a pair of antennas 428 that transmit a signal 430 intended for reception at a pair of antennas 432 of the corresponding receiver 416, 418 and 420. Interfering signals 434, which are unwanted signals, are received at the various antennas 432. For instance, the transmitter 402 emits a signal 430, via its antennas 428, the signal 430 being intended for reception at the antennas 432 of the receiver 416. This signal 430 is received as interfering signals 434 at the antennas 432 of the receivers 418 and 420.

The network 400 uses interference alignment to mitigate the effect of the various interfering signals 434 on the receivers 416, 418 and 420. To this end, the precoders 408, 410 and 412 each apply an interference alignment precoding matrix to data to be sent by the respective transmitters 402, 404 and 406. In the receivers 416, 418 and 420, the decoders 422, 424 and 426 each apply a combining matrix corresponding to the interference alignment precoding matrix of the respective precoder 408, 410 and 412 to decode the intended signal 430 while attenuating the interfering signals 434. A complete description of the interference alignment technique used in the network 400 FIG. 4 is found in "Distributed Real-Time Implementation of Interference Alignment with Analog Feedback", Lee et al., IEEE Transactions on Vehicular Technology, Vol. 64, No. 8, August 2015.

Figure 5:
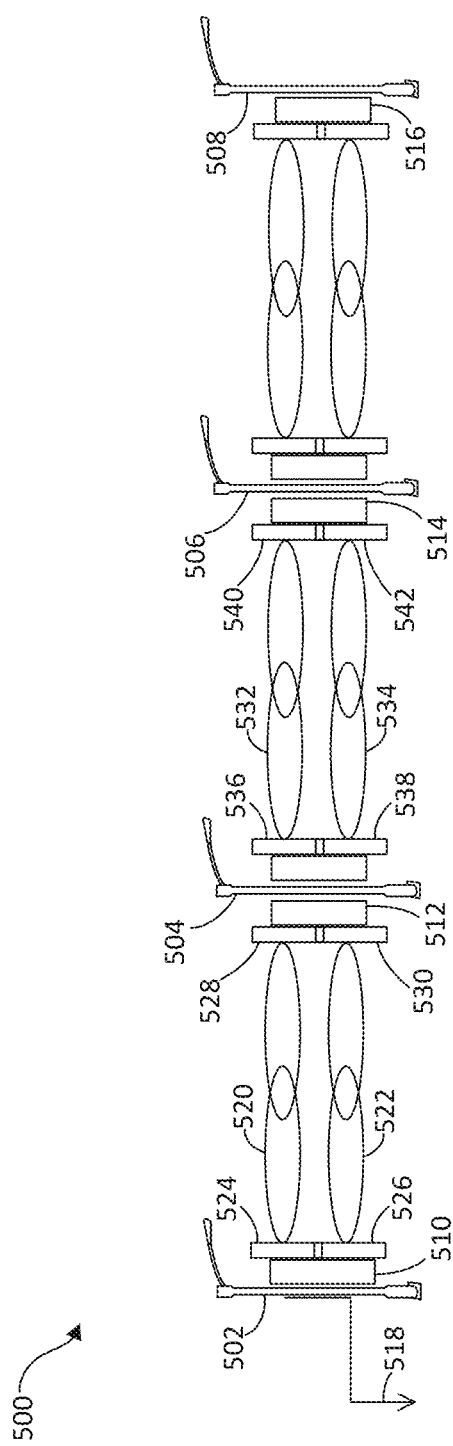
FIG. 5 is a schematic representation of nodes mounted on a series of lampposts as in FIG. 2, the nodes communicating using interference alignment on a LoS channel, according to an embodiment.

FIG. 5 is a schematic representation of nodes mounted on a series of lampposts as in FIG. 2, the nodes communicating using interference alignment on a LoS channel, according to an embodiment. A network 500 including a series of lampposts 502, 504, 506 and 508 carrying base stations 510, 512, 514 and 516 differs from the network 300 of FIG. 3 in that the base stations 510, 512, 514 and 516 do not use MIMO to exchange backhaul information, instead using the interference alignment technique introduced in the foregoing discussion of FIG. 4. The first lamppost 502 has a fiber point of access 518 for exchanging backhaul information between the first base station 510 and the core network. The fiber point of access 518 could alternatively be connected to any one of the lampposts 504, 506 and 508. The placement of the fiber point of access 518 within the network 500 has no impact on the interference alignment technique. The first base station 510 applies an interference alignment precoding matrix to the downlink backhaul information to be sent toward the second base station 512, thereby producing two distinct transmissions 520, 522. The two distinct transmissions 520, 522 are emitted by antennas 524, 526 of the first base station 510. The two distinct transmissions 520, 522 are received at antennas 528, 530 of the second base station 512. The second base station 512 applies a combining matrix corresponding to the interference alignment precoding matrix applied by the first base station 510 to decode the two transmissions 520, 522, thereby acquiring the downlink backhaul information. In turn, the second base station 512 extracts, from received downlink backhaul information, further downlink backhaul information to be sent to the third base station 514. To this end, the second base station 512 applies another interference alignment precoding matrix to the further downlink backhaul information to be sent to the third base station 514, thereby producing two distinct transmissions 532, 534. The two distinct transmissions 532, 534 are emitted by antennas 536, 538 of the second base station 512. The two distinct transmissions 532, 534 are received at antennas 540, 542 of the third base station 514. The third base station 514 applies another combining matrix corresponding to the interference alignment precoding matrix applied by the second base station 512 to decode the two transmissions 532, 534, thereby acquiring the further downlink backhaul information.

Exchange of uplink backhaul information from the fourth base station 516 up to the first base station 502 is performed in an equivalent manner. It should be noted, however, that a first interference alignment precoding matrix used, for example, to transmit downlink backhaul information from the first base station 502 to the second base station 504 may differ from a second interference alignment precoding matrix used to transmit uplink backhaul information from the second base station 504 to the first base station 502. These first and second interference alignment precoding matrices are computed independently from each other.

In an embodiment, the base stations 502, 504, 506 and 508 define interference alignment precoding matrices for transmitting backhaul information to each of their neighboring base stations based on a state of the LoS channel between each base station and each neighboring base station. To this end, for example, the first base station 502 sends a channel state information (CSI) reference signal via its antennas 524 and 526 to the second base station 504. The CSI reference signal is received at the second base station 504 via its antennas 528 and 530. The second base station 502 returns a CSI feedback signal to the first base station 502. The first base station 502 uses the CSI feedback signal to define an interference alignment precoding matrix for transmission to the second base station 504 while the second base station 504 defines a corresponding combining matrix for decoding transmissions received from the first base station 502. The second base station 504 also sends a distinct CSI reference signal to the first base station 502, which returns a distinct CSI feedback signal to the second base station 504 so that the second base station 504 can define an interference alignment precoding matrix for transmission to the first base station 502 while the first base station 502 defines a corresponding combining matrix. Without limitation, CSI may be obtained using the techniques described in "Distributed Real-Time Implementation of Interference Alignment with Analog Feedback", Lee et al., IEEE Transactions on Vehicular Technology, Vol. 64, No. 8, August 2015, Comparing the techniques illustrated in FIGS. 4 and 5, the interfering signals 434 shown on FIG. 4 intersect the signals 430 transmitted from, for example, the transmitter 404 and the antennas 432 of the receiver 418. Otherwise stated, distinct transmitter and receiver pairs of FIG. 4 are not in a same line of sight. Summarily stated, transmissions from the transmitters 402, 404 and 406 interfere with each other. By contrast in FIG. 5, transmissions 520 and 522 from the first base station 502 are the only ones that pass beyond the second base station 504, though with some attenuation (typically 10 dB blocking), and interfere with the transmissions 532 and 534. There is in FIG. 5 no other transmission arriving, for example at the base station 504, at an angle from the line of sight between the base stations 502 and 504. In fact, this (typical) 10 dB blocking by the base station 504 causes a diffraction phenomenon of the transmissions 520 and 522 that, in turn, adds phase rotations to the transmissions 520 and 522 as they pass beyond the base station 504. Attenuation and phase rotation of the transmissions 520 and 522 beyond the base station 504 generally lower the interference levels at the base stations 506 and 508. The attenuation and phase rotation are expected to help the interference alignment optimization, in turn reducing the complexity of the interference alignment precoding matrices and of the combining matrices in the base stations 502, 504, 506 and 508. It will be understood, however, this effect may vary as it depends on the equipment material at the various base stations 502, 504 and 506.

Comparing the network 500 of FIG. 5 with the network 300 of FIG. 3, the skilled reader will appreciate that, in at least one implementation, the network 300 could be adapted to implement the features of the network 500 by software modifications its various base stations to replace the splitting of the backhaul information and the MIMO technique of FIG. 3 with the interference alignment technique of FIG. 5. In at least one other implementation, hardware modifications may be made to the base stations, for example to avoid the splitting of the backhaul information of the network 300.

In an implementation, the antennas such as 524, 526, 528, 530, etc. of the base stations 502, 504, 506 and 508 may be beamforming antennas. Use of conventional (non-beamforming) antennas is also contemplated. In the same or other implementations, the antennas 524, 526, 528, 530 may comprise bidirectional antennas. In other implementations the antennas 524, 526, 528, 530 may comprise transmit antennas and be associated with further receive antennas (not shown).

Figure 6:
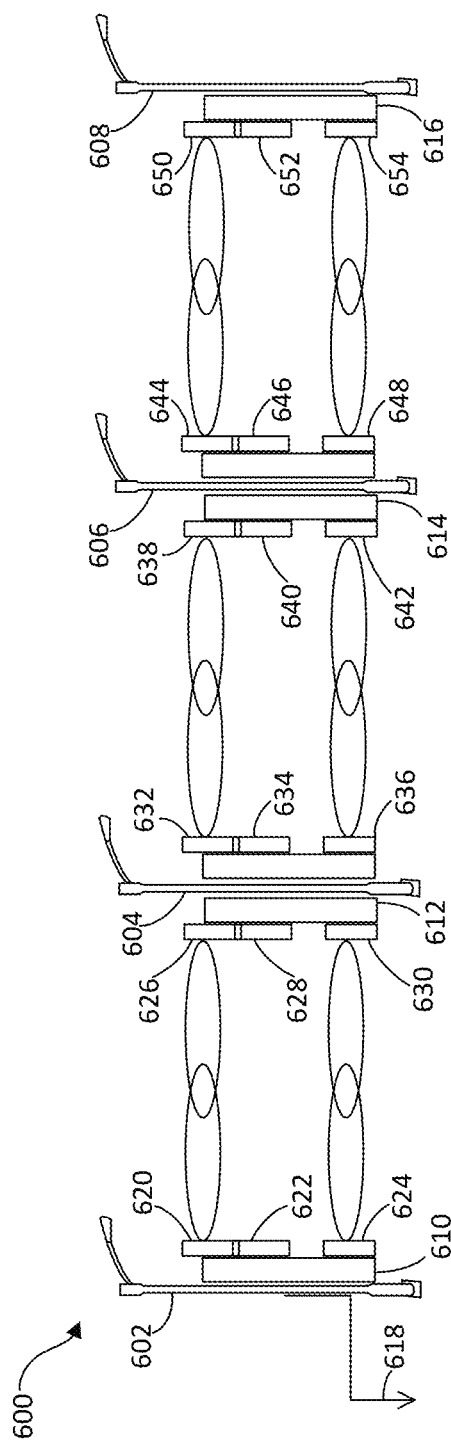
FIG. 6 is a schematic representation of nodes mounted on a series of lampposts as in FIG. 2, the nodes communicating using selectable, linearly aligned antennas according to another embodiment.

FIG. 6 is a schematic representation of nodes mounted on a series of lampposts as in FIG. 2, the nodes communicating using selectable, linearly aligned antennas according to another embodiment. A network 600 of lampposts 602, 604, 606 and 608 carrying base stations 610, 612, 614 and 616. The first lamppost 602 has a fiber point of access 618 for exchanging backhaul information between the first base station 610 and the core network. The fiber point of access 618 could alternatively be connected to any one of the lampposts 604, 606 and 608. Each base station has, for communicating with each peer base station, a plurality of linearly aligned antennas. For example, the first base station 610 has antennas 620, 622 and 624 for communicating with the second base station 612 that, in turn, has antennas 626, 628 and 630 for communicating with the first base station 610. The second base station 612 also has antennas 632, 634 and 636 for communicating with the third base station 614. Likewise, the third base station 614 has antennas 638, 640 and 642 for communicating with the second base station 612 and antennas 644, 646 and 648 for communicating antennas 650, 652 and 654 of the fourth base station 616.

Communication between the first base station 610 and the second base station 612 is made using a point-to-point MIMO technique that involves the selection of a pair of antennas at each of these base stations. The selection is made so that a spacing between the selected antennas is a function of a distance between the base stations 610 and 612 and of a wavelength of a communication exchanged between the node and the peer node.

Figure 7:
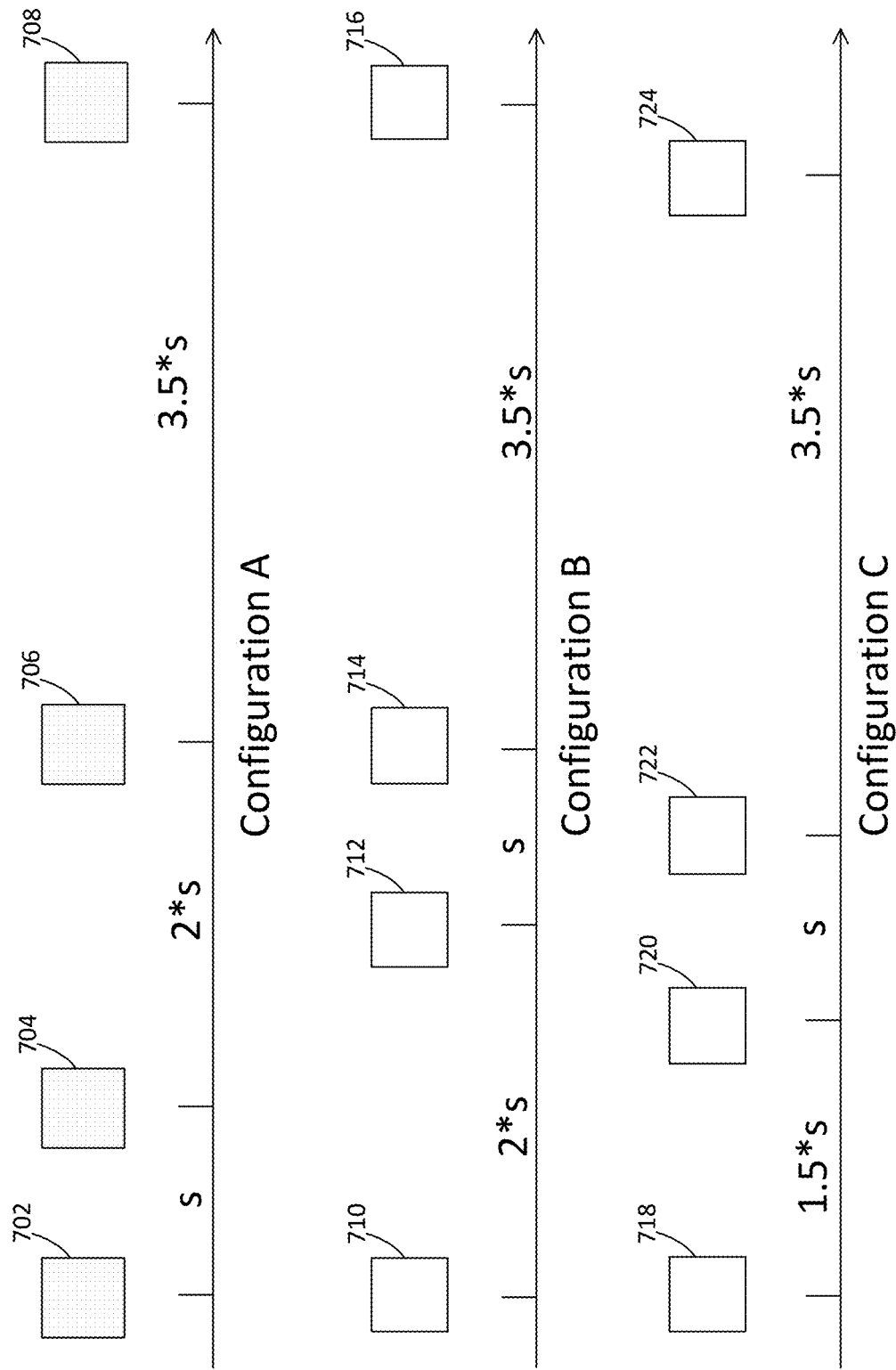
FIG. 7 is an illustration of various configurations for pluralities of linearly aligned antennas.

FIG. 7 is an illustration of various configurations for pluralities of linearly aligned antennas. These configurations may be implemented in any one of the base stations 610, 612, 614 and 616 of FIG. 6. Without limitation, the configurations of FIG. 7 each comprise four (4) antennas. In some implementations, the various antennas shown on FIG. 7 may be beamforming antennas. Use of conventional (non-beamforming) antennas is also contemplated. In the same or other implementations, the configurations of FIG. 7 may comprise bidirectional antennas. In other implementations the pluralities of linearly aligned antennas illustrated on FIG. 7 may comprise transmit antennas and be associated with further pluralities of linearly aligned receive antennas (not shown). The three (3) configurations of FIG. 7 provide non-limitative examples of possible configurations that can each be used at any one of the base stations 610, 612, 614 and 616.

Configuration A comprises linearly aligned antennas 702, 704, 706 and 708 that are all connected to a same base station. The second antenna 704 is positioned at a spacing s from the first antenna 702, in which s is an antenna spacing factor whose value is determined as expressed hereinbelow. The third antenna 706 is positioned at a spacing 2s from the second antenna 704 and at a spacing 3s from the first antenna 702. The fourth antenna 708 is positioned at a spacing 3.5s from the third antenna 706 and at a spacing 6.5s from the first antenna 702. When selecting two of the antennas 702, 704, 706 and 708, a resulting spacing between the pair of selected antennas will necessary be equal to one of s, 2s, 3s, 3.5s, 5.5s or 6.5s.

Configuration B comprises linearly aligned antennas 710, 712, 714 and 716 that are all connected to a same base station. The second antenna 712 is positioned at a spacing 2s from the first antenna 710. The third antenna 714 is positioned at a spacing s from the second antenna 712 and at a spacing 3s from the first antenna 710. The fourth antenna 716 is positioned at a spacing 3.5s from the third antenna 714 and at a spacing 6.5s from the first antenna 710. When selecting two of the antennas 710, 712, 714 and 716, a resulting spacing between the pair of selected antennas will necessary be equal to one of s, 2s, 3s, 3.5s, 4.5s or 6.5s.

Configuration C comprises linearly aligned antennas 718, 720, 722 and 724 that are all connected to a same base station. The second antenna 720 is positioned at a spacing 1.5s from the first antenna 718. The third antenna 722 is positioned at a spacing s from the second antenna 720 and at a spacing 2.5s from the first antenna 718. The fourth antenna 724 is positioned at a spacing 3.5s from the third antenna 722 and at a spacing 6s from the first antenna 710. When selecting two of the antennas 718, 720, 722 and 724, a resulting spacing between the pair of selected antennas will necessary be equal to one of s, 1.5s, 2.5s, 3.5s, 4.5s or 6s.

In all configurations A, B and C, a spacing between any pair of antennas selected among the antennas of a given configuration is different from a spacing between at least five other pairs antennas selected among the of that configuration, without redundancy. In any configuration having one less antenna reduces the number of possible antenna spacings without introducing any redundancy. For example, a spacing between any pair of antennas selected among the antennas 702, 704 and 706 of configuration A is different from a spacing between at least two other pairs antennas selected among the antennas 702, 704 and 706, without redundancy. Adding a further antenna in any configuration, for example at an equal spacing s between the antennas 704 and 706, may introduce spacing redundancy between the various selectable pairs of antennas.

In an embodiment, the antenna spacing factor is defined according to equation (1):

$$s = 5 \cdot \sqrt{\text{lambda}} \tag{1}$$

wherein lambda is the wavelength in meters.

As shown on FIG. 7, spacings between any two antenna in configurations A, B and C are all integer multiples of 0.5s. Other configurations of the plurality of linearly aligned antennas are also contemplated. A configuration may include more or less antennas, the antennas may be positioned at variable spacings that are not necessary integer multiples of 0.5s, and some redundancy may be found between selectable pairs of antennas.

Returning to FIG. 6, point-to-point MIMO causes a data stream to be sent from the first base station 602 to the second base station 604 with different amplitudes and phases over the two selected antennas. In some embodiments the data can be sent with different amplitudes and different phases. In some such embodiments, different amplitudes can be set for each of the different phases, so that each phase may be paired (uniquely or otherwise) with a particular amplitude.

In an embodiment combining the point-to-point MIMO technique with the interference alignment technique, for a given antenna spacing, a 2×2 channel matrix $H_{ij}$ is defined, in which i is a receiver index and j is a transmitter index. Using interference alignment, we obtain equations (2) to (10):

$$\text{rank}(W_0 * H_{00} * F_0) = 1 \tag{2}$$

$$\text{rank}(W_1 * H_{11} * F_1) = 1 \tag{3}$$

$$\text{rank}(W_2 * H_{22} * F_2) = 1 \tag{4}$$

$$W_0 * H_{01} * F_1 = 0 \tag{5}$$

$$W_0 * H_{02} * F_2 = 0 \tag{6}$$

$$W_1 * H_{10} * F_0 = 0 \tag{7}$$

$$W_1 * H_{12} * F_2 = 0 \tag{8}$$

$$W_2 * H_{20} * F_0 = 0 \tag{9}$$

$$W_2 * H_{21} * F_1 = 0 \tag{10}$$

wherein $W_i$ is the $i^{th}$ equalizer vector, and $F_j$ is the $j^{th}$ precoder vector. The actually signal transmitted on each antenna in a form $F_j*d_j$, in which $d_j$ is a transmitted data stream from a $j^{th}$ transmitter. Therefore, each transmitter transmits d multiplied by a complex value. $W_{ii}$ and $F_j$ may be solved, for example, using an alternate minimization method proposed in: S. W. Peters and R. W. Heath, Jr., "Interference Alignment Via Alternating Minimization," *Proc. of the IEEE Int. Conf. on Acoustics, Speech, and Signal Proc.*, Taipei, Taiwan, April 2009, pp. 2445-2448.

For point-to-point MIMO on a LoS channel, given a selected antenna spacing s, the channel matrix is denoted by H. Performing a singular value decomposition to H allows finding the precoding vector F corresponding to the largest singular value. Then the transmitted signals on the transmit antennas look like F*d, where d is the scalar signal and F is the complex valued precoding matrix. Therefore, each transmitter transmits: d multiplied by a complex value.

CSI information may be used for the selection of pairs of antennas between peer base stations. For example, the first base station 602 selects a first pair with antennas 620 and 622 to send a CSI reference signal to the second base station 604. The second base station 604 returns a CSI feedback signal to the first base station 602, this CSI feedback signal being received at the antennas 620 and 622. This sequence is repeated between the first base station 602 and the second base station 604 for another pair comprising the antennas 620 and 624, and then for a further pair comprising the antennas 622 and 624. The base station 602 selects the pair of antennas for communicating with the base station 604 according to a most favorable of the received CSI feedback signals. This entire process is repeated all links connecting any two neighboring base stations.

The base station 604 also selects a pair of antennas for communicating with the base station 602. Each base station independently makes its own selection. Though the selection processes are independent, they are expected to arrive at a same antenna spacing for the transmitting antennas at the base stations 602 and for the receiving antennas at the base station 604. However, the base stations 602 and 604 may not select the same antenna spacing for communicating in the reverse direction because channel conditions in one direction may differ from channel conditions in the other direction. This is especially the case when carrier frequencies used for transmitting from the base station 602 to the base station 604 and from the base station 604 to the base station 602 are not the same. When the carrier frequencies are sufficiently close, the base stations 602 and 604 may select the same antenna spacing in both directions, allowing in turn the use of bidirectional antennas. The present technology does not impose symmetry of the selection of antenna spacings in both directions between a given pair of base stations.

In one embodiment, when deployed for a specific frequency band, the spacings and antenna selections for transmissions within the frequency band may be done using a selected frequency within the band. In one embodiment, a center frequency of the band may be used for the antenna selection for all transmissions within the band. In other embodiments, other representative frequencies may be selected for the band. In one such example of a center frequency use, when a deployment uses a V-band range, it may support frequencies between 57 and 66 GHz. A center frequency of 61.5 GHz may be used for determination of the antenna spacings.

It may be observed that point-to-point MIMO is applied between a node and a peer node and does not depend on a third node. Point-to-point MIMO can therefore be used between nodes that are not on a same line of sight. For example, the antenna section technique may be used between nodes having a geographical configuration as illustrated in FIG. 1.

Optionally, when the base stations of the network 600 are on a line of sight, they may at once use point-to-point MIMO along with the interference alignment technique. In fact, these techniques may be used separately or in combination. CSI information obtained by the various base stations may be used at once in the context of the interference alignment technique and in the context of point-to-point MIMO.

Figure 8:
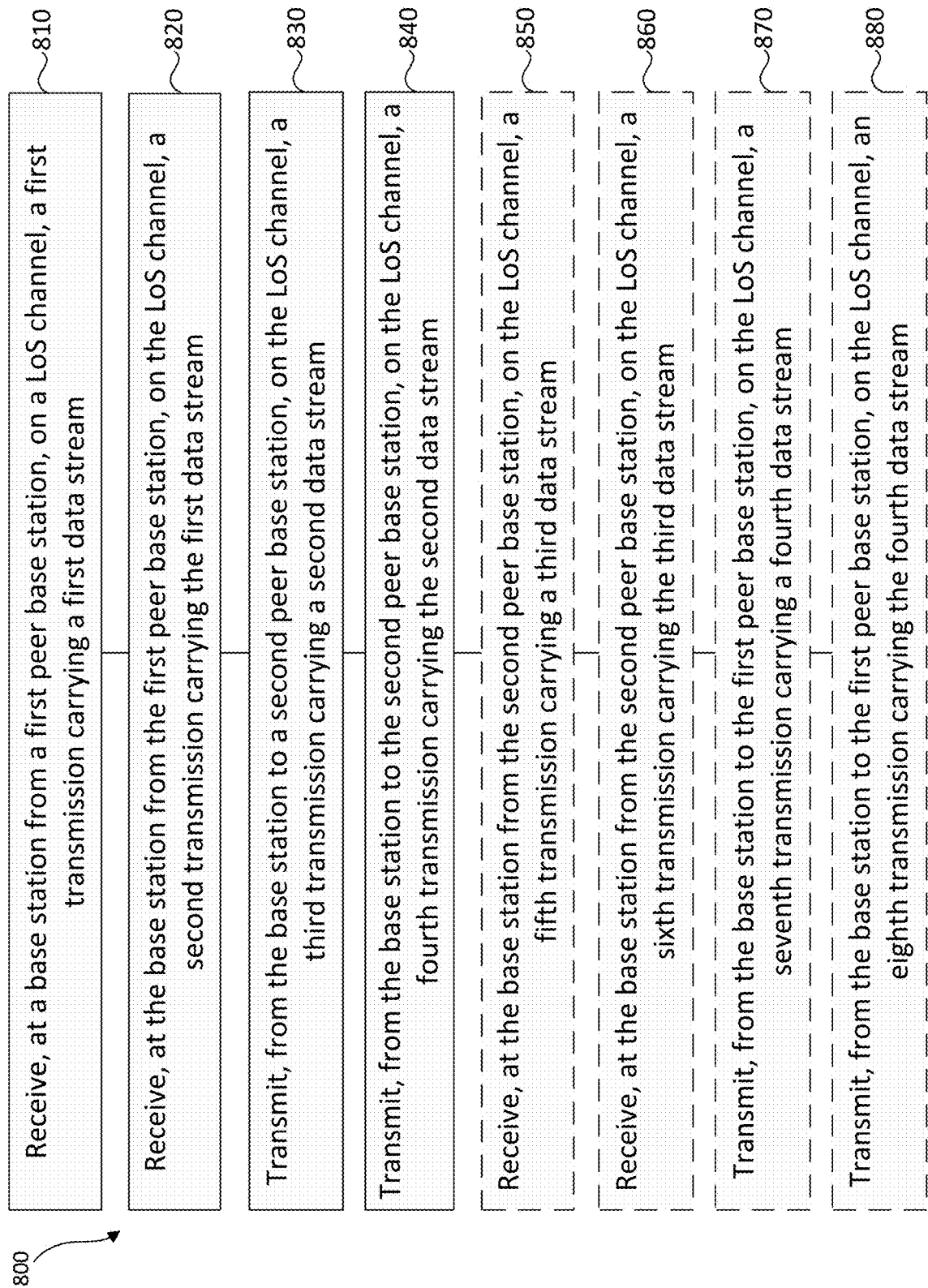
FIG. 8 is a sequence diagram showing operations of a data transmission method using interference alignment on a LoS channel.

FIG. 8 is a sequence diagram showing operations of a data transmission method using interference alignment on a LoS channel. On FIG. 8, a sequence 800 comprises a plurality of operations that may be executed in variable order, some of the operations possibly being executed concurrently, some of the operations being optional. The sequence 800 is best understood when considering at once FIGS. 5 and 8. For illustration purposes and without limiting the present disclosure, the sequence 800 is described as implemented in the base station 512. The sequence 800 includes operation 810, in which the base station 512 receives from a first peer base station, which may be either of the base stations 510 or 514, on a line of sight (LoS) channel, a first transmission carrying a first data stream. A second transmission also carrying the first data stream is received at operation 820 from the first peer base station. The first and second transmissions are formed according to a first interference alignment precoding matrix. An example of a method for defining interference alignment precoding matrices is described later in the present disclosure. At operation 830, the base station 512 transmits, on the LoS channel, a third transmission carrying a second data stream to a second peer base station, which is the other of the base stations 510 or 514. A fourth transmission also carrying the second data stream is transmitted to the second peer base station at operation 840. The third and fourth transmissions are formed according to a second interference alignment precoding matrix. The base station 512 may also receive on the LoS channel at operation 850, from the second peer base station, a fifth transmission carrying a third data stream. A sixth transmission also carrying the third data stream may be received at operation 860, also from the second peer base station. The fifth and sixth transmissions are formed according to a third interference alignment precoding matrix. The base station 512 may transmit on the LoS channel, to the first peer base station, a seventh transmission carrying a fourth data stream at operation 870. An eighth transmission also carrying the fourth data stream may be transmitted at operation 880, also to the first peer base station. The seventh and eighth transmissions are formed according to a fourth interference alignment precoding matrix.

The various transmissions of operations 810, 820, 830, 840, 850, 860, 870 and 880 may be received and transmitted in the form of beams exchanged between beamforming antennas at the base stations 510, 512 and 514. Use of non-beamforming antennas is also contemplated. Moreover, the various transmissions of operations 810, 820, 830, 840, 850, 860, 870 and 880 may optionally be received and transmitted using the above described point-to-point MIMO technique that uses selectable, linearly aligned antennas.

The sequence 800 may be generalized to other types of nodes connected in a daisy chain. However, in the specific context here the nodes are base stations such as the base stations 510, 512, 514 and 516, at least of part of each one of the first and second data streams comprises backhaul information. If the first peer base station having transmitted the first data stream is the uplink peer base station 510, being located closer to the fiber access point 518 that connects that the network 500 to the core network, the payload of the first data stream comprises (a) downlink backhaul data for the benefit of the base station 512, for extraction and transmission by the base station 512 as downlink data to one or more UEs on a separate channel, for example an LTE channel or a 5G channel, and (b) further downlink backhaul data to be transmitted to the second peer base station, which is in this case the base station 514. If, on the other hand, the first peer base station having transmitted the first data stream is the downlink peer base station 514, being located further away from the fiber access point 518 that connects that the network 500 to the core network, the payload of the first data stream comprises uplink backhaul data from the first peer base station 514. The base station 512 receives additional uplink data from one or more UEs, for example on an LTE or a 5G channel. The base station 512 combines the uplink backhaul data from the first peer base station 514 with such uplink data received from one or more UEs and form uplink backhaul data to be inserted as part of the second data stream.

Figure 9:
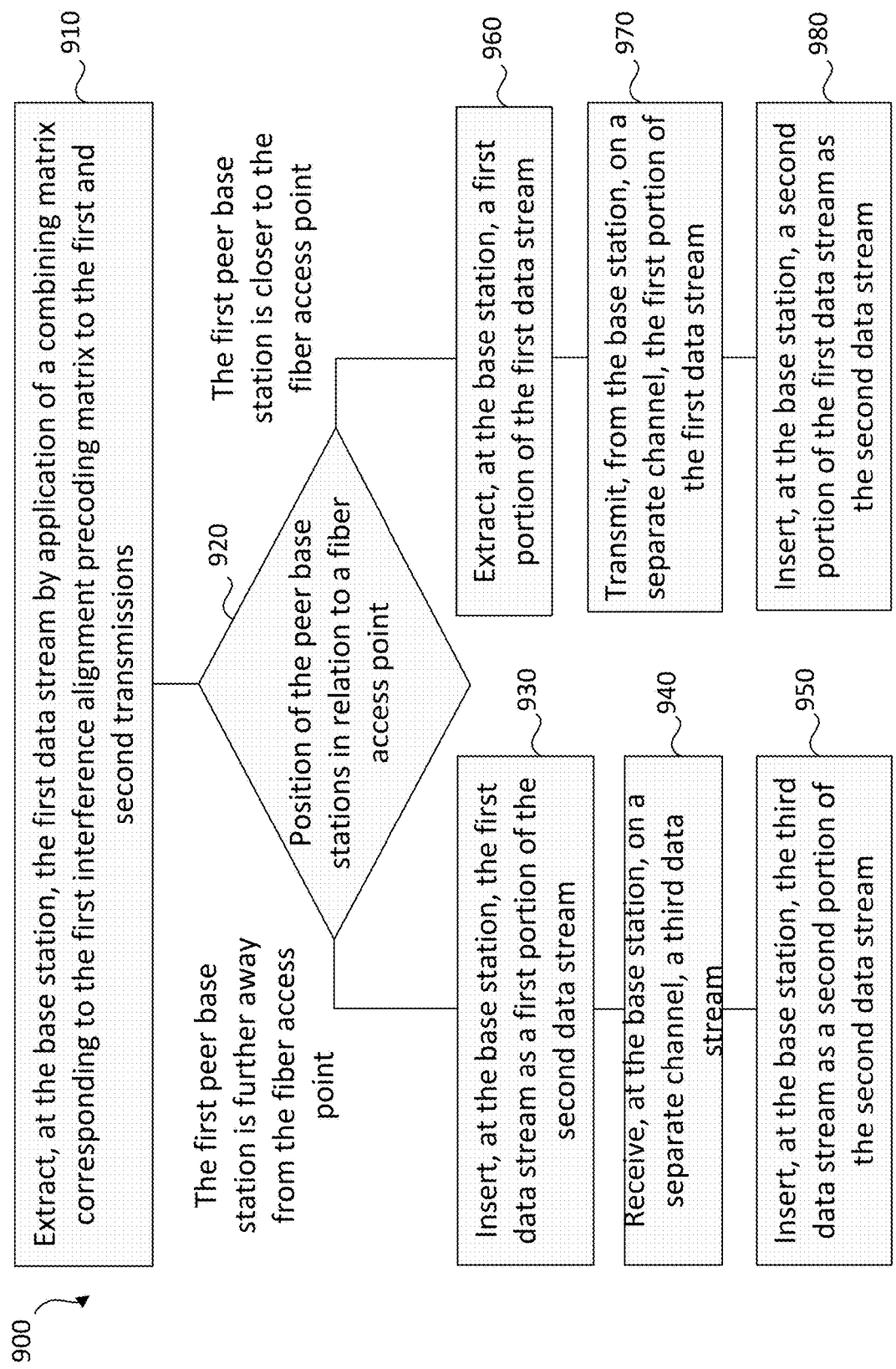
FIG. 9 is a sequence diagram showing operations of a method using a combining matrix to extract information from a received data stream.

In more details, FIG. 9 is a sequence diagram showing operations of a method using a combining matrix to extract information from a received data stream. On FIG. 9, a sequence 900 comprises a plurality of operations that may be executed in variable order, some of the operations possibly being executed concurrently, some of the operations being optional. For illustration purposes and without limiting the present disclosure, the sequence 900 may be considered as an optional extension of FIG. 8 and, for that reason, is also described as implemented in the base station 512. The sequence 900 is best understood when considering at once FIGS. 5 and 9. The sequence 900 includes operation 910 for decoding, at the base station 512, the first data stream received from the first peer base station at operations 810 and 820 by application of a combining matrix to the first and second transmissions. The combining matrix corresponds to the first interference alignment precoding matrix. Other operations of the sequence 900 depend on the direction of information within the network 500 of FIG. 5.

Operation 920 considers the position of the first and second peer base stations in relation to the fiber access point 518. If the first peer base station is the base station 514, being further away from the fiber access point 518 than the base station 512, the first data stream received from the base station 514 at operations 810 and 820 comprises uplink backhaul data. The base station 512 inserts, at operation 930, the first data stream as a first portion of the second data stream to be sent at operations 830 and 840 to the base station 510 (i.e. the second peer base station). Having received, at operation 940, a third data stream on a separate channel, including for example uplink data received from one or more UEs on an LTE channel or on a 5G channel, the base station 512 inserts, at operation 950, that third data stream as a second portion of the second data stream to be sent as uplink backhaul data to the base station 510 at operations 830 and 840.

If, on the other hand, at operation 920, the first peer base station is the base station 510, being closer to the fiber access 518 point than the base station 512, the first data stream received from the base station 510 at operations 810 and 820 comprises downlink backhaul data. The base station 512 extracts, at operation 960, a first portion of the first data stream and transmits, at operation 970, that first portion on a separate LTE, 5G or like channel as downlink data toward one or more UEs. At operation 980, the base station 512 inserts a second portion of the first data stream in the second data stream sent as downlink backhaul data to the base station 514 (i.e. the second peer base station) at operations 830 and 840.

The third data stream received at the base station 512 at operations 850 and 860 is processed in the same or equivalent manner as described in relation to FIG. 9.

The first data stream extracted in operation 910 may include backhaul information, as expressed hereinabove, and may further include additional information elements, for example maintenance and/or monitoring information for the base station 512. Additionally, the extraction process may be imperfect and errors may be introduced. Forward error correction (FEC) and like techniques may be used to alleviate the possibilities of errors. These issues are independent from the present technology, so the present disclosure does not further address issues related to error correction and detection, and issues related to the inclusion of data, other than backhaul data, in the described data streams. These simplifications are made to simplify the present illustration and are not meant to limit the generality of the present disclosure.

Figure 10:
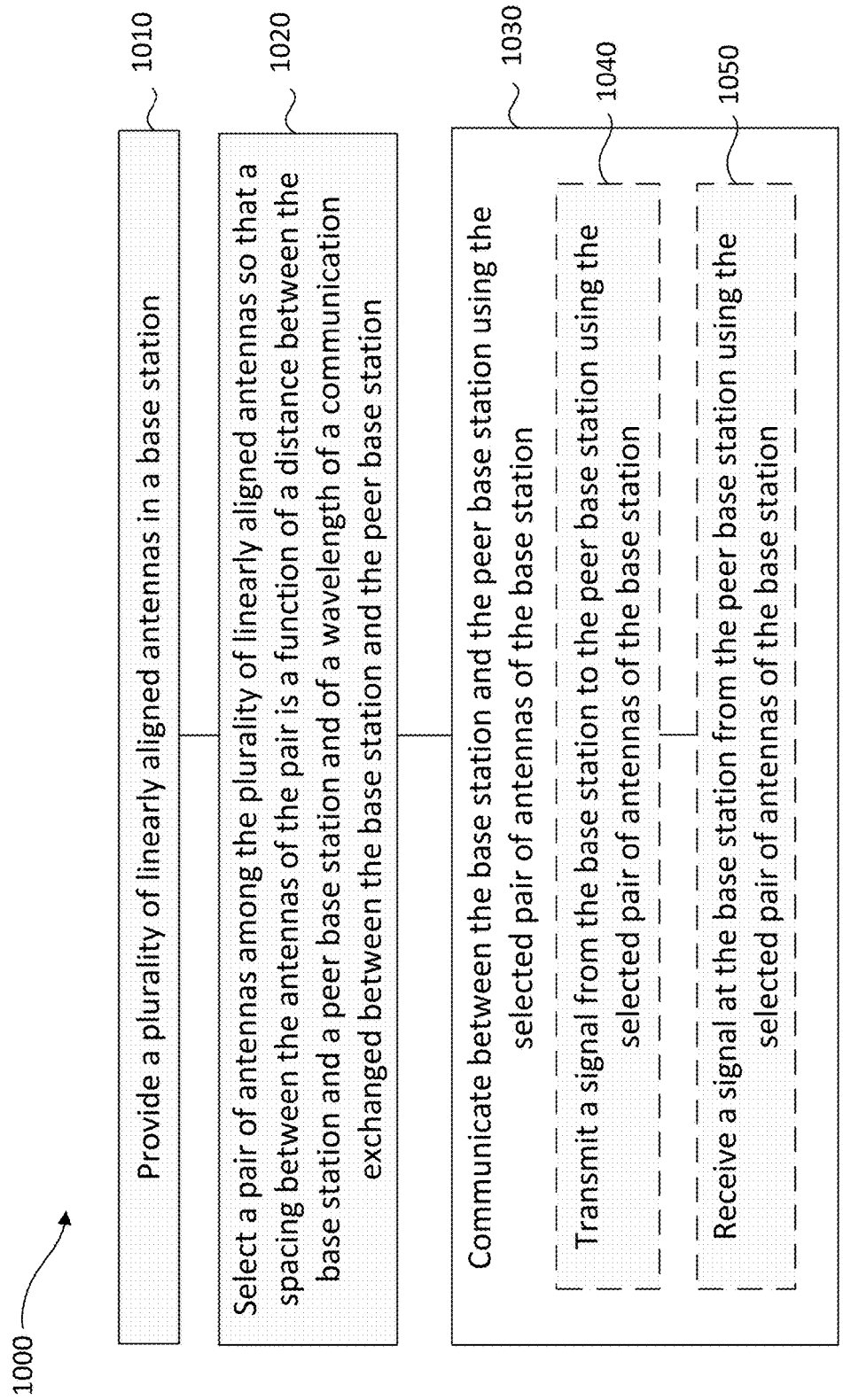
FIG. 10 is a sequence diagram showing operations of a method of communicating between nodes using selectable, linearly aligned antennas.

FIG. 10 is a sequence diagram showing operations of a method of communicating between nodes using selectable, linearly aligned antennas. On FIG. 10, a sequence 1000 comprises a plurality of operations that may be executed in variable order, some of the operations possibly being executed concurrently, some of the operations being optional. The sequence 1000 is best understood when considering at once FIGS. 6, 7 and 10. For illustration purposes and without limiting the present disclosure, the sequence 1000 is described as implemented in the base station 612. The sequence 1000 includes operation 1010 in which a plurality of linearly aligned antennas is provided at the base station 612. In an implementation, the antennas 632, 634 and 636 are provided at operation 1010 to allow communication between the base station 612 and the base station 614. Another plurality of linearly aligned antennas 626, 628 and 630 may also be provided at the base station 612 for communicating with the base station 610. In other implementations, the plurality of linearly aligned antennas may instead comprise antennas arranged according to one of configurations A, B or C In any case, an array comprising the plurality of linearly aligned antennas is positioned at the base station 612 for direct communication with the base station 614. A pair of antennas of the base station 612 is selected at operation 1020 among a plurality of linearly aligned antennas of the base station 612 so that a spacing between the antennas of the pair is a function of a distance between the base station 612 and the base station 614 and of a wavelength of a communication exchanged between the base stations 612 and 614. An example of a method for selecting the antennas of the pair is described later in the present disclosure.

Operation 1030 comprises communicating between the base stations 612 and 614 using the selected pair of antennas of the base station 612. This communication may comprise transmitting, at operation 1040 a signal from the base station 612 to the base station 614 or receiving, at operation 1050 a signal from the base station 614 at the base station 612, or both. One or both of the operations 1040 and 1050 can be repeated multiple times, as per the need of a particular application.

Figure 11:
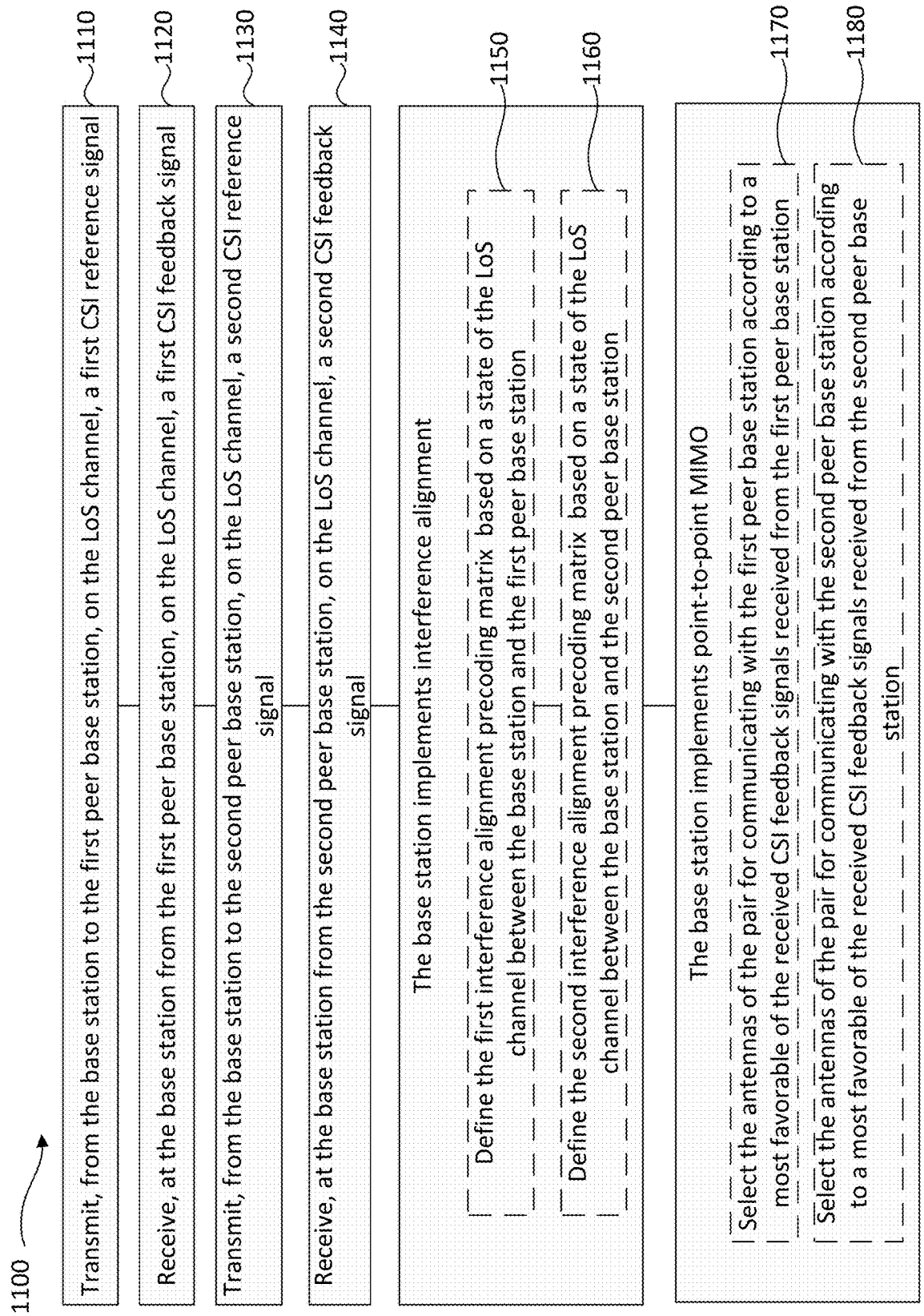
FIG. 11 is a sequence diagram showing operations of a method for exchanging channel state (CSI) information.

Channel state information (CSI) may be exchanged between a node and first and second peer nodes, for example between a base station and first and second peer based stations. FIG. 11 is a sequence diagram showing operations of a method for exchanging channel state (CSI) information. On FIG. 11, a sequence 1100 comprises a plurality of operations that may be executed in variable order, some of the operations possibly being executed concurrently, some of the operations being optional. The sequence 1100 is best understood when considering at once FIGS. 6 and 11. For illustration purposes and without limiting the present disclosure, the sequence 1100 is described as implemented in a particular embodiment of the base station 612 that supports one or both of the interference alignment technique of FIG. 5 and the point-to-point MIMO technique of FIG. 6. The base station 612 transmits to a first peer base station 610, on the LoS channel, a first channel state information (CSI) reference signal at operation 1110. The base station 612 also receives from the first peer base station 610, on the LoS channel, a first CSI feedback signal at operation 1120. Operation 1130 comprises the transmission, from the base station 612 to a second peer base station 614, on the LoS channel, of a second CSI reference signal. Operation 1140 comprises receiving, at the base station 612 from the second peer base station 614, on the LoS channel, a second CSI feedback signal.

In an embodiment using the interference alignment technique, the first interference alignment precoding matrix for use for example in operations 810 and 820 may be defined based on a state of the LoS channel between the base station 612 and the first peer base station 610 at operation 1150. A first combining matrix corresponding to the first interference alignment precoding matrix may also be defined at the same time. The second interference alignment precoding matrix may be defined based on a state of the LoS channel between the base station 612 and the second peer base station 614 at operation 1160, the second interference alignment precoding matrix being used for example in operations 830 and 840. A second combining matrix corresponding to the second interference alignment precoding matrix may also be defined at the same time. The third and fourth interference alignment precoding matrices mentioned in the description of operations 850, 860, 870 and 880 and corresponding third and fourth combining matrices may be defined in similar fashion.

In an embodiment using point-to-point MIMO, the operations 1110 and 1120 may be repeated for each selectable pair of antennas of the base station 612 that can communicate with the first peer base station 610. Likewise, the operations the operations 1130 and 1140 may be repeated for each selectable pair of antennas of the base station 612 that can communicate with the second peer base station 614. At operation 1170, at the base station 612, the antennas of the pair for communicating with the first peer base station 610 are selected according to a most favorable of the CSI feedback signals received at the base station 612 from the first peer base station 610 at various instances of operation 1120. At operation 1180, the antennas of the pair of the base station 612 for communicating with the second peer base station 614 are selected according to a most favorable of the CSI feedback signals received at the base station 612 from the second peer base station 614 at various instances of operation 1140.

Figure 12:
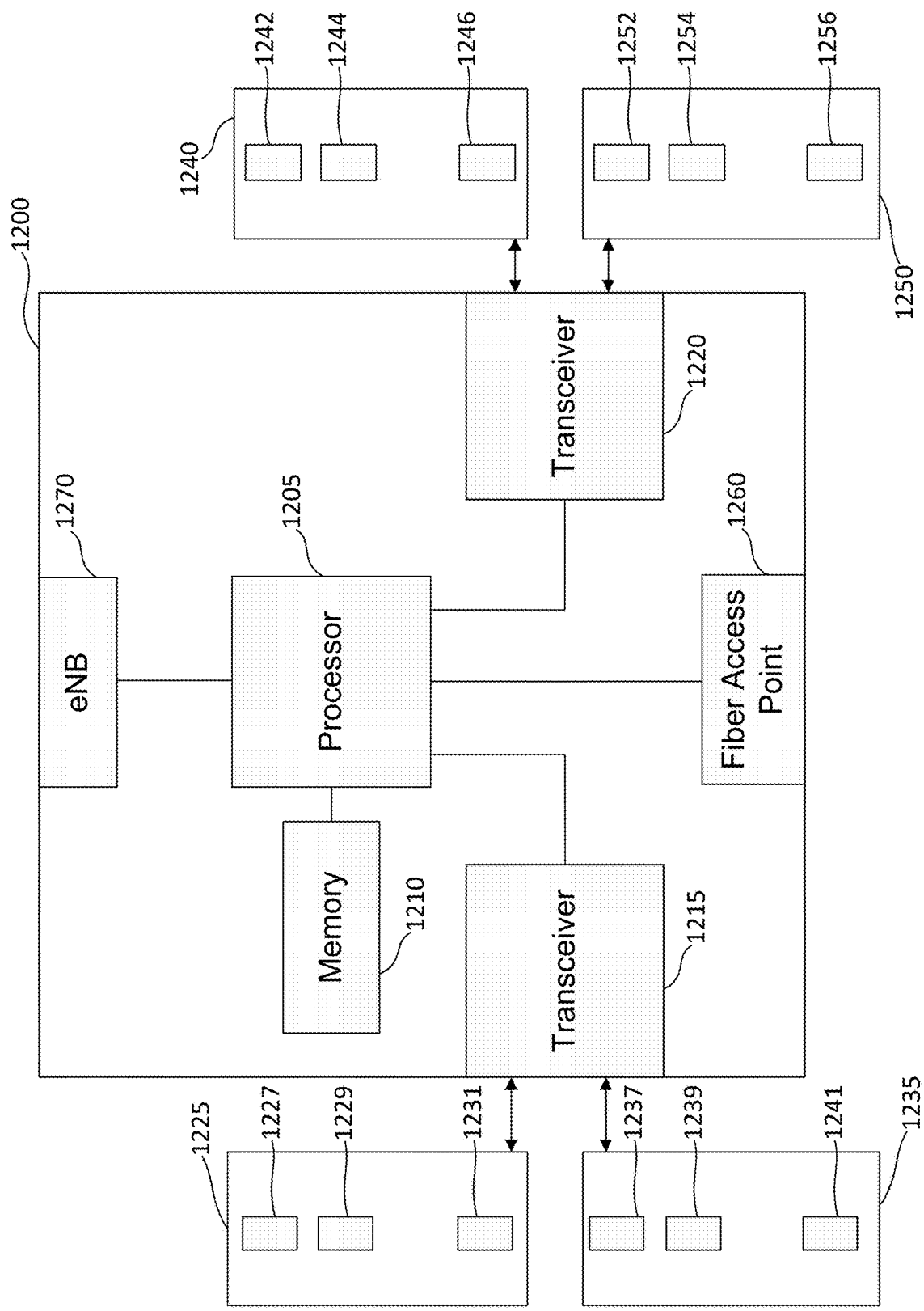
FIG. 12 is a block diagram of a node according to a further embodiment.

Each of the operations of the sequences 800, 900, 1000 and 1100 may be configured to be processed by one or more processors, the one or more processors being coupled to a memory. In more details, FIG. 12 is a block diagram of a node according to a further embodiment. A node may comprise a base station 1200 that implements the interference alignment technique, or point-to-point MIMO, or both of these techniques. The present description provides a non-limitative example of a base station 1200 that implements both techniques.

The base station 1200 comprises a processor 1205 operatively connected to a memory 1210. The processor 1205 may include a plurality of co-processors. The memory 1210 may include one or more memory modules. The base station 1200 also comprises a radio interface unit that includes at least one transceiver 1215 for communicating with a first peer base station. The radio interface unit may also include another transceiver 1220 for communicating with a second peer base station. The transceivers 1215 and 1220 may each be capable of transmitting and receiving; alternatively, each transceiver 1215 and 1220 may be substituted by a distinct transmitter and receiver.

The transceiver 1215 is operatively coupled to at least one antenna for communicating with the first peer base station. In the example as shown on FIG. 12, the transceiver 1215 is coupled to an array 1225 of linearly aligned transmit antennas 1227, 1229 and 1231. The transceiver 1215 is also coupled to an array 1235 of linearly aligned receive antennas 1237, 1239 and 1241. The transceiver 1220 is operatively coupled to at least one antenna for communicating with the second peer base station. In the example as shown on FIG. 12, the transceiver 12220 is coupled to an array 1240 of linearly aligned transmit antennas 1242, 1244 and 1246. The transceiver 1220 is also coupled to an array 1250 of linearly aligned receive antennas 1252, 1254 and 1256. The arrays 1225, 1235, 1240 and 1250 may be built using, for example, the configurations A, B or C illustrated on FIG. 7. In a variant, the transceivers 1215 and 1220 may be coupled to arrays of bidirectional antennas. In another variant, the base station 1200 may not use arrays of linearly aligned antennas, for example when the base station 1200 implements the interference alignment technique without using point-to-point MIMO. The various antennas shown on FIG. 12 may optionally be beamforming antennas.

The base station 1200 may further comprise a fiber access point 1260. Referring again to FIGS. 5 and 6, some implementations of the base station 1200 may include the fiber access point 1260 while others may not. Although not shown on FIGS. 5 and 6, the fiber access point 1260 may be located at any base station 1200 of a daisy chain; the fiber access point 1260 is not necessarily present in a base station 1200 located at one end of a daisy chain of base stations 1200. Some implementations of the base station 1200 may include a single transceiver 1215 or 1220 and antennas for communicating with one peer base station 1200, for example when that base station 1200 is at one end of a daisy chain of base stations 1200.

The processor 1205 may also be operatively coupled to a radio unit 1270. Though not shown, internal components of the radio unit 1270 may include a processor, a memory, LTE and/or 5G radio equipment comprising a receive and a transmitter, or a transceiver, and one or more antennas for communicating with UEs.

The processor 1205 generally controls operations of the base station 1200. Without limitation, the processor 1205 is informed by the transceiver 1215 of the reception, from the first peer base station, of first and second transmissions carrying a first data stream. The processor 1205 is configured to apply a combining matrix to decode the first data stream. The processor 1205 applies an interference alignment precoding matrix to a second data stream to form third and fourth transmissions and causes the transceiver 1220 to transmit the third and fourth transmissions to the second peer base station.

When the first peer base station is further away from a fiber access point than the base station 1200, the processor 1205 may insert a portion of the first data stream as the second data stream and extract another portion first data stream to form a third data stream. The processor 1205 then causes the radio unit 1270 to transmit the third data stream to one or more UEs. When the first peer base station is closer to a fiber access point than the base station 1200, the processor 1205 may insert the first data stream as a first portion of the second data stream. Being informed by the radio unit 1270 of the reception of a third data stream received from one or more UEs, the processor 1205 inserts the third data stream as a second portion of the second data stream.

The processor 1205 may cause the transceivers 1215 and 1220 to respectively send CSI reference signals to the first and second peer base stations. Being informed by the transceivers 1215 and 1220 of the reception of CSI feedback signals, the processor 1205 determines the state of channels between the base station 1200 and the first and second peer base stations. The processor 1205 defines interference alignment precoding matrices for forming transmissions towards the first and second peer base stations based on the state of the channels. The processor also defines combining matrices for decoding transmissions from the first and second peer base stations, the combining matrices being also defined based on the state of the channels. The processor may also cause the transceivers 1215 and 1220 to send the CSI reference signals for each selectable pair of the antennas of the arrays 1225 and 1240 and cause the transceivers 1215 and 1220 to select pairs of antennas of the arrays 1235 and 1250 for receiving the CSI feedback signals (in implementations using bidirectional antennas, the same antennas are used for transmitting the CSI reference signals and for receiving corresponding CSI feedback signals). For corresponding to a given peer base station, the processor 1205 selects the antennas of the pair according to a most favorable of the received CSI feedback signals.

Figure 13:
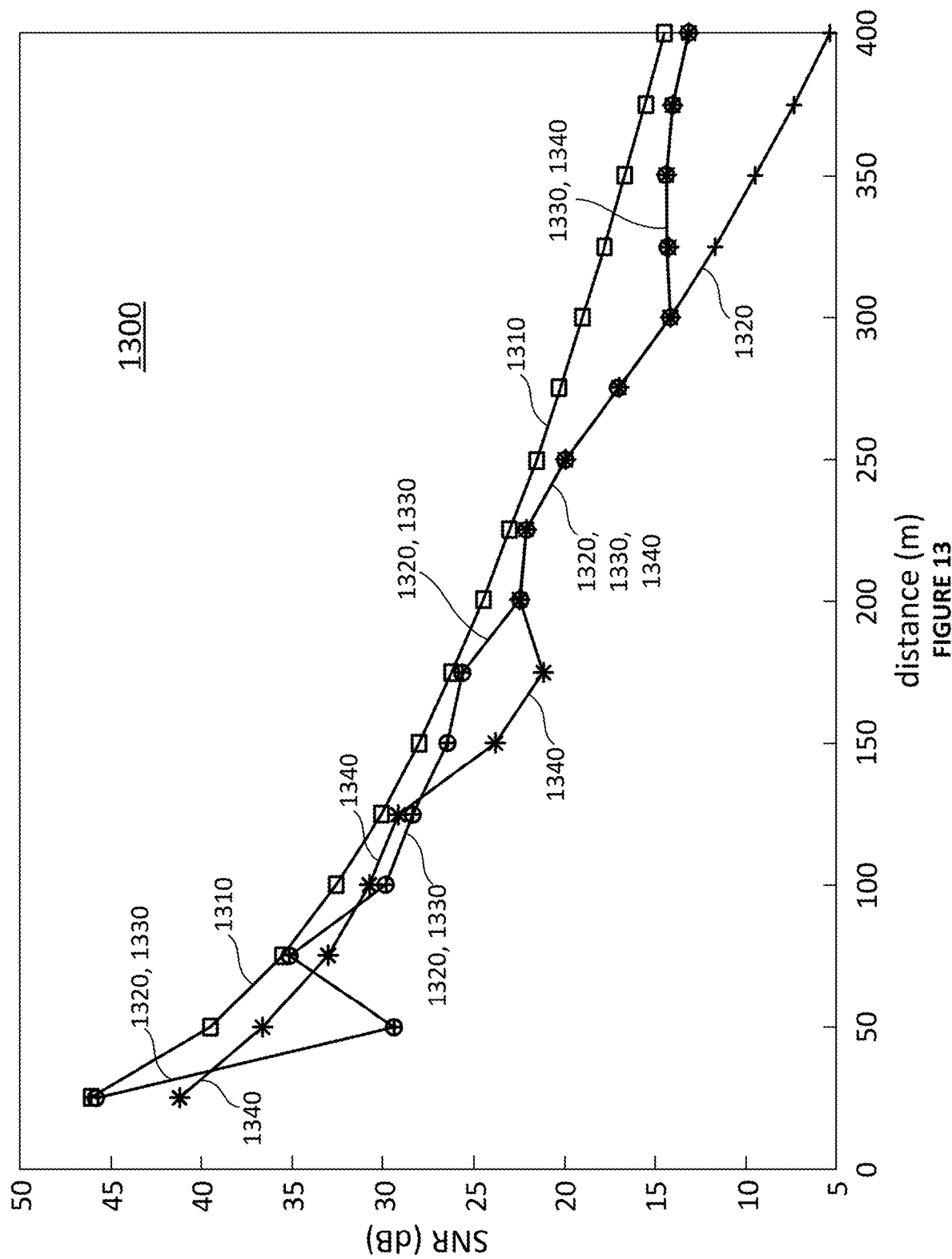
FIG. 13 is a graph showing a signal to noise performance of a transmission in view of a distance between nodes when using the interference alignment technique and the point-to-point MIMO technique combined in a same implementation.

FIG. 13 is a graph showing a signal to noise performance of a transmission in view of a distance between nodes when using the interference alignment technique and the point-to-point MIMO technique combined in a same implementation. A graph 1300 illustrates a variation of achievable SNR, in dB, as a function of a distance, in meters, between two peer nodes, for the three configurations of FIG. 7. Results are presented for a 5 mm wavelength (60.48 GHz carrier frequency), total attenuation and rain fade of 20 dB per kilometer, transmit power of 12 dBm, transmit and receive antenna gains of 28 dB, 1.74 GHz signal bandwidth, noise figure (NF) of 7 dB.

Curve 1310 shows how the SNR decreases as a function of a distance between nodes, in a LoS scenario, assuming a perfect antenna spacing selection. Curve 1320 represents an achievable performance using Configuration A. Curve 1330 represents an achievable performance using Configuration B. Curve 1340 represents an achievable performance using Configuration C. Curves 1320, 1330 and 1340 are provided for same distances between the nodes. The performance of each configuration varies according to the distance between two peer nodes (between two lampposts on FIGS. 5 and 6). One of the Configurations A, B and C may be selected upon installation of each one the nodes 1200 in a daisy chain of nodes on a street, based on the present graph 1300 and based on a known distance between lampposts. The nodes 1200 will then select the pairs of antennas among the chosen Configuration A, B or C based on the exchanges of CSI information.

Various embodiments of the methods and nodes using the interference alignment technique and/or the point-to-point MIMO technique, as disclosed herein, may be envisioned, as expressed in the following paragraphs.

In some implementations of the present interference alignment technique, the first and second transmissions are received in the form of first and second beams, the third and fourth transmissions being transmitted in the form of third and fourth beams.

In some implementations of the present interference alignment technique, the method further comprises receiving at the node from the second peer node, on the LoS channel, a fifth transmission carrying a third data stream and a sixth transmission carrying the third data stream, the fifth and sixth transmissions being formed according to a third interference alignment precoding matrix, the method also comprising transmitting, from the node to the first peer node, on the LoS channel, a seventh transmission carrying a fourth data stream and an eighth transmission carrying the fourth data stream, the seventh and eighth transmissions being formed according to a fourth interference alignment precoding matrix.

In some implementations of the present interference alignment technique, the first data stream includes a payload of the second data stream.

In some implementations of the present interference alignment technique, the second data stream includes a payload of the first data stream.

In some implementations of the present interference alignment technique, the method further comprises receiving, at the node, on a separate channel, a third data stream, inserting, at the node, the first data stream as a first portion of the second data stream, and inserting, at the node, the third data stream as a second portion of the second data stream.

In some implementations of the present interference alignment technique, the method further comprises extracting, at the node, a first portion of the first data stream, transmitting, from the node, on a separate channel, the first portion of the first data stream, and inserting, at the node, a second portion of the first data stream in the second data stream.

In some implementations of the present interference alignment technique, the processor is further adapted to decode the first data stream by application of a combining matrix to the first and second transmissions, the combining matrix corresponding to the first interference alignment precoding matrix.

In some implementations of the present point-to-point MIMO technique, communicating between the node and the peer node comprises receiving a signal from the peer node at the node.

In some implementations of the present point-to-point MIMO technique, the linearly aligned antennas are collectively selected from the group consisting of transmit antennas, receive antennas, and bidirectional antennas.

In some implementations of the present point-to-point MIMO technique, the plurality of linearly aligned antennas comprises transmit antennas, the node having a second plurality of linearly aligned receive antennas.

In some implementations of the present point-to-point MIMO technique, a spacing between any pair of antennas among the plurality of linearly aligned antennas is different from a spacing between at least two other pairs of antennas among the plurality of linearly aligned antennas.

In some implementations of the present point-to-point MIMO technique, a spacing between any pair of antennas among the plurality of linearly aligned antennas is different from a spacing between at least five other pairs of antennas among the plurality of linearly aligned antennas.

In some implementations of the present point-to-point MIMO technique, the radio interface unit is selected from the group consisting of a transmitter, a receiver and a transceiver In some implementations of the present point-to-point MIMO technique, the linearly aligned antennas are collectively selected from the group consisting of transmit antennas, receive antennas, and bidirectional antennas.

In some implementations of the present point-to-point MIMO technique, the plurality of linearly aligned antennas comprises at least four antennas, a spacing between any pair of antennas selected among four of the at least four antennas being different from a spacing between any other pair of antennas among the four of the at least four antennas.

In a an implementation combining the present interference alignment technique with the present point-to-point MIMO technique, there is provided a data transmission method. A first transmission carrying a first data stream and a second transmission carrying the first data stream are received, at a node from a first peer node, on a line of sight (LoS) channel. The first and second transmissions are formed according to a first interference alignment precoding matrix. The first and second transmissions are received at a first pair of antennas of the node, the antennas of the first pair being selected among a first plurality of linearly aligned antennas so that a first spacing between the antennas of the first pair is a function of a first distance between the node and the first peer node and of a wavelength of the LoS channel A third transmission carrying a second data stream and a fourth transmission carrying the second data stream are transmitted, from the node to a second peer node, on the LoS channel. The third and fourth transmissions are formed according to a second interference alignment precoding matrix. The third and fourth transmissions are transmitted from a second pair of antennas of the node, the antennas of the second pair being selected among a second plurality of linearly aligned antennas so that a second spacing between the antennas of the second pair is a function of a second distance between the node and the second peer node and of the wavelength of the LoS channel.

In some implementations combining the present interference alignment technique with the present point-to-point MIMO technique, the antennas of the first and second pluralities of linearly aligned antennas are beamforming antennas.

In some implementations combining the present interference alignment technique with the present point-to-point MIMO technique, the method further comprises, for each pair of antennas among the first plurality of linearly aligned antennas, transmitting, from the node to the first peer node, on the LoS channel, a channel state information (CSI) reference signal and receiving, at the node from the first peer node, on the LoS channel, a CSI feedback signal, the method also comprising selecting the antennas of the first pair according to a most favorable of the CSI feedback signals received from the first peer node, the method further comprising, for each pair of antennas among the second plurality of linearly aligned antennas, transmitting, from the node to the second peer node, on the LoS channel, a channel state information (CSI) reference signal, and receiving, at the node from the second peer node, on the LoS channel, a CSI feedback signal, the method also comprising selecting the antennas of the second pair according to a most favorable of the CSI feedback signals received from the second peer node, the first interference alignment precoding matrix being defined based on the most favorable of the CSI feedback signals received from the first peer node, the second interference alignment precoding matrix being defined based on the most favorable of the CSI feedback signals received from the second peer node.

In an implementation combining the present interference alignment technique with the present point-to-point MIMO technique, there is provided a node comprising a receiver, a transmitter, first and second pluralities of linearly aligned antennas and a processor. The antennas of the first plurality of linearly aligned antennas are communicatively coupled to the receiver. The receiver is adapted to receive, from a first peer node, on a line of sight (LoS) channel, a first transmission carrying a first data stream and a second transmission carrying the first data stream, the first and second transmissions being formed according to a first interference alignment precoding matrix. The antennas of the second plurality of linearly aligned antennas are communicatively coupled to transmitter. The transmitter is adapted to transmit, to a second peer node, on the LoS channel, a third transmission carrying a second data stream and a fourth transmission carrying the second data stream, the third and fourth transmissions being formed according to a second interference alignment precoding matrix. The processor is operatively connected to the receiver and to the transmitter. The processor is adapted to select a first pair of antennas among the first plurality of linearly aligned antennas for the receiver to receive the first and second transmissions, the first pair of antennas being selected so that a spacing between the antennas of the first pair is a function of a distance between the node and the first peer node and of a wavelength of the first and second transmissions. The processor is further adapted to select a second pair of antennas among the second plurality of linearly aligned antennas for the transmitter to transmit the third and fourth transmissions, the second pair of antennas being selected so that a spacing between the antennas of the second pair is a function of a distance between the node and the second peer node and of a wavelength of the third and fourth transmissions.

Those of ordinary skill in the art will realize that the description of the methods and nodes for multi-hop data transmission between evolved node Bs are illustrative only and are not intended to be in any way limiting. Other embodiments will readily suggest themselves to such persons with ordinary skill in the art having the benefit of the present disclosure. Furthermore, the disclosed methods and nodes may be customized to offer valuable solutions to existing needs and problems related to daisy chaining of evolved node Bs. In the interest of clarity, not all of the routine features of the implementations of the methods and nodes are shown and described. In particular, combinations of features are not limited to those presented in the foregoing description as combinations of elements listed in the appended claims form an integral part of the present disclosure. It will, of course, be appreciated that in the development of any such actual implementation of the methods and nodes, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of wireless communications having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A data transmission method, comprising:
   receiving, at a node from a first peer node, on a line of sight (LoS) channel, a first transmission carrying a first data stream and a second transmission carrying the first data stream, the first and second transmissions being formed according to a first interference alignment precoding matrix, at least a portion of the first data stream comprising first backhaul information;
   defining second backhaul information by adding, to the first backhaul information, a third data stream received from a user terminal on a separate channel to or by subtracting, from the first backhaul information, a fourth data stream transmitted to the user terminal on the separate channel; and
   transmitting, from the node to a second peer node, on the LoS channel, a third transmission carrying a second data stream and a fourth transmission carrying the second data stream, at least a portion of the second data stream comprising the second backhaul information, the third and fourth transmissions being formed according to a second interference alignment precoding matrix.

2. The method of claim 1, wherein:
   the first interference alignment precoding matrix is defined based on a state of the LoS channel between the first and second node; and
   the second interference alignment precoding matrix is defined based on a state of the LoS channel between the first and third node.

3. The method of claim 2, further comprising:
   transmitting, from the node to the first peer node, on the LoS channel, a first channel state information (CSI) reference signal;
   receiving, at the node from the first peer node, on the LoS channel, a first CSI feedback signal;
   transmitting, from the node to the second peer node, on the LoS channel, a second CSI reference signal; and
   receiving, at the node from the second peer node, on the LoS channel, a second CSI feedback signal.

4. The method of claim 1, further comprising decoding, at the node, the first data stream by application of a combining matrix to the first and second transmissions, the combining matrix corresponding to the first interference alignment precoding matrix.

5. A data transmission method, comprising:
   communicating between a node and a peer node using a pair of antennas of the node, the antennas of the pair being selected among a plurality of linearly aligned antennas so that a spacing between the antennas of the pair is a function of a distance between the node and the peer node and of a wavelength of a communication exchanged between the node and the peer node;
   wherein communicating between the node and the peer node comprises transmitting a signal from the node to the peer node at a first amplitude and a first phase using a first antenna of the pair and at a second amplitude and a second phase using a second antenna of the pair, the first amplitude being different from the second amplitude and the second phase being different from the second phase.

6. The method of claim 5, wherein the antennas of the plurality of linearly aligned antennas are beamforming antennas.

7. The method of claim 5, further comprising:
   for each pair of antennas among the plurality of linearly aligned antennas:
     transmitting, from the node to the peer node, a channel state information (CSI) reference signal, and
     receiving, at the node from the peer node, a CSI feedback signal; and
   selecting the antennas of the pair according to a most favorable of the received CSI feedback signals.

8. The method of claim 5, wherein the plurality of linearly aligned antennas comprises at least four antennas, a spacing between any pair of antennas selected among four of the at least four antennas being different from a spacing between any other pair of antennas among the four of the at least four antennas.

9. A node, comprising:
   a first receiver configured to receive, from a first peer node, on a line of sight (LoS) channel, a first transmission carrying a first data stream and a second transmission carrying the first data stream, the first and second transmissions being formed according to a first interference alignment precoding matrix, at least a portion of the first data stream comprising first backhaul information;
   a radio base station configured to:
     receive a third data stream from a user terminal on a separate channel,
     transmit a fourth data stream to the user terminal on the separate channel, and
     define second backhaul information by adding the third data stream to the first backhaul information or by subtracting the fourth data stream from the first backhaul information; and a first transmitter configured to transmit, to a second peer node, on the LoS channel, a third transmission carrying a second data stream and a fourth transmission carrying the second data stream, at least a portion of the second data stream comprising the second backhaul information, the third and fourth transmissions being formed according to a second interference alignment precoding matrix.

10. The node of claim 9, further comprising:
a second receiver configured to receive, from the second peer node, on the LoS channel, a fifth transmission carrying a fifth data stream and a sixth transmission carrying the fifth data stream, the fifth and sixth transmissions being formed according to a third interference alignment precoding matrix; and
a second transmitter configured to transmit, to the first peer node, on the LoS channel, a seventh transmission carrying a sixth data stream and an eighth transmission carrying the sixth data stream, the seventh and eighth transmissions being formed according to a fourth interference alignment precoding matrix.

11. The node of claim 10, further comprising:
a first receive antenna operatively connected to the first receiver;
a second receive antenna operatively connected to the second receiver;
a first transmit antenna operatively connected to the first transmitter; and
a second transmit antenna operatively connected to the second transmitter.

12. The node of claim 11, wherein the first and second receive antennas and the first and second transmit antennas are beamforming antenna.

13. The node of claim 10, further comprising a processor operatively connected to the first and second transmitters and to the first and second receivers, the processor being configured to:
cause the first transmitter to transmit, to the first peer node, on the LoS channel, a first channel state information (CSI) reference signal;
acquire from the first receiver a first CSI feedback signal received from the first peer node on the LoS channel;
cause the second transmitter to transmit, to the second peer node, on the LoS channel, a second CSI reference signal; and
acquire from the second receiver a second CSI feedback signal received from the second peer node on the LoS channel.

14. The node of claim 13, wherein the processor is further configured to:
define the first and fourth interference alignment precoding matrices based on a state of the LoS channel between the node and the first peer node, the state being determined based on the first CSI feedback signal;
define the second and third interference alignment precoding matrices based on the state of the LoS channel between the node and the second peer node, the state being determined based on the second CSI feedback signal.

15. A node, comprising:
a radio interface unit configured to communicate with a peer node;
a plurality of linearly aligned antennas, the antennas of the plurality of linearly aligned antennas being communicatively coupled to the radio interface unit; and
a processor operatively connected to the radio interface unit and configured to select a pair of antennas among the plurality of linearly aligned antennas for the radio interface unit to communicate with the peer node, the selection being so that a spacing between the antennas of the pair is a function of a distance between the node and the peer node and of a wavelength of a communication exchanged between the node and the peer node;
wherein:
the radio interface comprises a transmitter; and
the processor is further configured to cause the transmitter to transmit a signal to the peer node at a first amplitude and a first phase using a first antenna of the pair and at a second amplitude and a second phase using a second antenna of the pair, the first amplitude being different from the second amplitude and the second phase being different from the second phase.

16. The node of claim 15, wherein the processor is further configured to:
for each pair of antennas among the plurality of linearly aligned antennas:
cause the radio interface unit to transmit, to the peer node, a channel state information (CSI) reference signal, and acquire, from the radio interface unit, a CSI feedback signal received from the peer node;
the processor selecting the antennas of the pair according to a most favorable of the received CSI feedback signals.

17. The node of claim 15, further comprising a fiber access point operatively connected to the processor and configured for communicatively coupling the radio interface unit and a core network.

18. The node of claim 15, wherein an antenna spacing factor is defined as:

$$s = 5 \cdot \sqrt{lamda};$$

wherein:
s is the antenna spacing factor in meters; and
lambda is the wavelength in meters.

19. The node of claim 18, wherein the plurality of linearly aligned antennas comprises:
a first antenna;
a second antenna positioned at a spacing s from the first antenna;
a third antenna positioned at a spacing 2s from the second antenna and at a spacing 3s from the first antenna; and
a fourth antenna positioned at a spacing 3.5s from the third antenna and at a spacing 6.5s from the first antenna.

20. The node of claim 18, wherein the plurality of linearly aligned antennas comprises:
a first antenna;
a second antenna positioned at a spacing 2s from the first antenna;
a third antenna positioned at a spacing s from the second antenna and at a spacing 3s from the first antenna; and
a fourth antenna positioned at a spacing 3.5s from the third antenna and at a spacing 6.5s from the first antenna.

21. The node of claim 18, wherein the plurality of linearly aligned antennas comprises:
a first antenna;
a second antenna positioned at a spacing 1.5s from the first antenna;
a third antenna positioned at a spacing s from the second antenna and at a spacing 2.5s from the first antenna; and
a fourth antenna positioned at a spacing 3.5s from the third antenna and at a spacing 6s from the first antenna.

* * * * *